US008644549B2

(12) United States Patent
Foland et al.

(10) Patent No.: US 8,644,549 B2
(45) Date of Patent: Feb. 4, 2014

(54) RECONSTRUCTION METHOD USING DIRECT AND ITERATIVE TECHNIQUES

(75) Inventors: Andrew D. Foland, Wellesley, MA (US); Boris Oreper, Newton, MA (US); Vitaliy Ziskin, Brighton, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 122 days.

(21) Appl. No.: 13/364,182

(22) Filed: Feb. 1, 2012

(65) Prior Publication Data

US 2012/0195458 A1 Aug. 2, 2012

Related U.S. Application Data

(60) Provisional application No. 61/438,560, filed on Feb. 1, 2011.

(51) Int. Cl.
*G06K 9/00* (2006.01)
*A61B 6/00* (2006.01)

(52) U.S. Cl.
USPC .............................. 382/100; 382/154; 378/9

(58) Field of Classification Search
USPC ......... 382/100, 103, 106–107, 128–133, 143, 382/154, 162, 168, 173, 181, 199, 203, 209, 382/219, 224, 232, 254, 274, 276, 286, 291, 382/305, 312; 600/436; 378/9, 57, 21
See application file for complete search history.

(56) References Cited

U.S. PATENT DOCUMENTS

| 6,862,335 | B2 | 3/2005 | Basu et al. | |
| 7,120,283 | B2* | 10/2006 | Thieret et al. | 382/131 |
| 7,606,348 | B2* | 10/2009 | Foland et al. | 378/57 |
| 7,616,729 | B2 | 11/2009 | Vengrinovich et al. | |
| 7,831,012 | B2* | 11/2010 | Foland et al. | 378/9 |
| 8,423,125 | B2* | 4/2013 | Rousso et al. | 600/436 |
| 2006/0062443 | A1* | 3/2006 | Basu et al. | 382/131 |
| 2008/0267480 | A1 | 10/2008 | Nielsen et al. | |
| 2008/0273651 | A1 | 11/2008 | Boas | |
| 2010/0316188 | A1 | 12/2010 | Eilbert et al. | |
| 2011/0293158 | A1 | 12/2011 | Popescu | |

FOREIGN PATENT DOCUMENTS

WO WO 2012/003850 A1 1/2012

OTHER PUBLICATIONS

Written Opinion for International Application No. PCT/US2012/023529.

De Man, B. et al., "A Study of Four Minimization Approaches for Iterative Reconstruction in X-ray CT", *2005 IEEE Nuclear Science Symposium Conference Record*, Wyndham El Conquistator Resort, Puerto Rico, Oct. 23-29, 2005, vol. 5, pp. 2708-2710.

(Continued)

*Primary Examiner* — Seyed Azarian
(74) *Attorney, Agent, or Firm* — Wolf, Greenfield & Sacks, P.C.

(57) ABSTRACT

A system and method for forming volumetric images of an imaged object based on multiple radiation measurements of the object taken from different angles. A first volumetric image of the object may be calculated using a direct reconstruction method from a plurality of radiation measurements of the object. At least one iteration of an iterative reconstruction method may be performed to compute a second volumetric image of the object. The iterative reconstruction method may be initialized with the first volumetric image of the object.

31 Claims, 18 Drawing Sheets

(56) References Cited

OTHER PUBLICATIONS

Kawata, S. et al., "Constrained Iterative Reconstruction by the Conjugate Gradient Method", *IEEE Trans. on Med. Imaging*, vol. MI-4, No. 2, Jun. 1, 1985, pp. 65-71.

Zbijewski, W. et al., "Suppression of Intensity Transition Artifacts in Statistical X-ray Computer Tomography Reconstruction through Radon Inversion Initialization", *Med. Phys., AIP*, Melville, NY, vol. 31, No. 1, Jan. 1, 2004, pp. 62-69.

Partial International Search Report for International Application No. PCT/US2012/023529 mailed May 3, 2012.

* cited by examiner

ART

- Maximum Likelihood $\mathcal{M}^2$
  - Function of density estimates $k$
    - And forward-projected attenuation estimate $X$
  - Depends on rays $i$
    - Their measurements $x$ and uncertainty $\sigma$
    - $\sigma$ is known a priori from physics and level of attenuation $$\mathcal{M}^2(\hat{\rho}_k) = \sum_i \frac{(X_i(\hat{\rho}_k) - x_i)^2}{\sigma_i^2}$$

- Find set of $\rho$ that minimizes $\mathcal{M}^2$ $$\rho_k \text{ s.t. } \frac{\partial \mathcal{M}^2}{\partial \rho_k} = 0$$

*FIG. 3*

Iteration

- Solve Iteratively
- Start with a guess (constant density in all voxels) and maximize likelihood cell-by-cell
  - Straightforward but tedious algebra
  - $f_{\ell k}$ = contribution of $\ell^{th}$ ray to $k^{th}$ pixel (mostly 0's)

$$\Delta \rho_i = \frac{\sum_\ell (f_{\ell i}/\sigma_\ell)(1/\sigma_\ell)(x_\ell - \sum_k f_{\ell k}\rho_k)}{\sum_\ell f_{\ell i}^2/\sigma_\ell^2}$$

*Essentially: weighted average of discrepancies of all rays passing through pixel*

*FIG. 4*

Relaxation

- Do this $\rho' = \rho + \lambda \Delta\rho$
  - How to choose $\lambda$ ?
    - Minimize $\mathcal{M}^2$ with respect to $\lambda$    s.t. $\frac{\partial \mathcal{M}^2}{\partial \lambda} = 0$
    - Result is (rays $j$, pixels $k$):

$$\lambda = \frac{\sum_j (c_j/\sigma_j^2)(x_j - \sum_k f_{jk}\rho_k)}{\sum_j (c_j^2/\sigma_j^2)} \qquad c_j = \sum_k f_{jk}\Delta\rho_k$$

*FIG. 5*

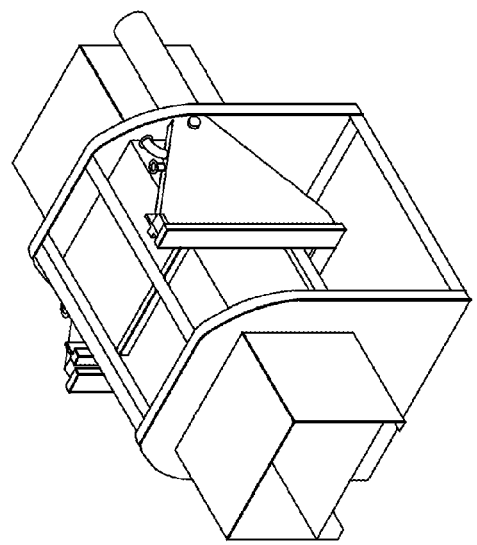
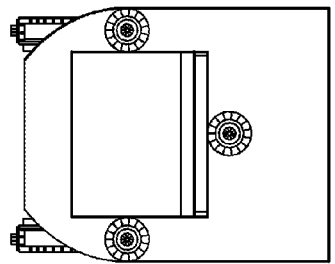
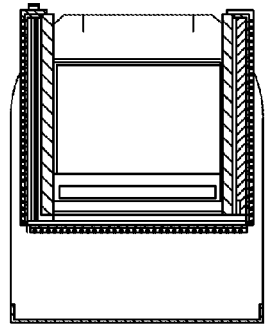
Section J—J
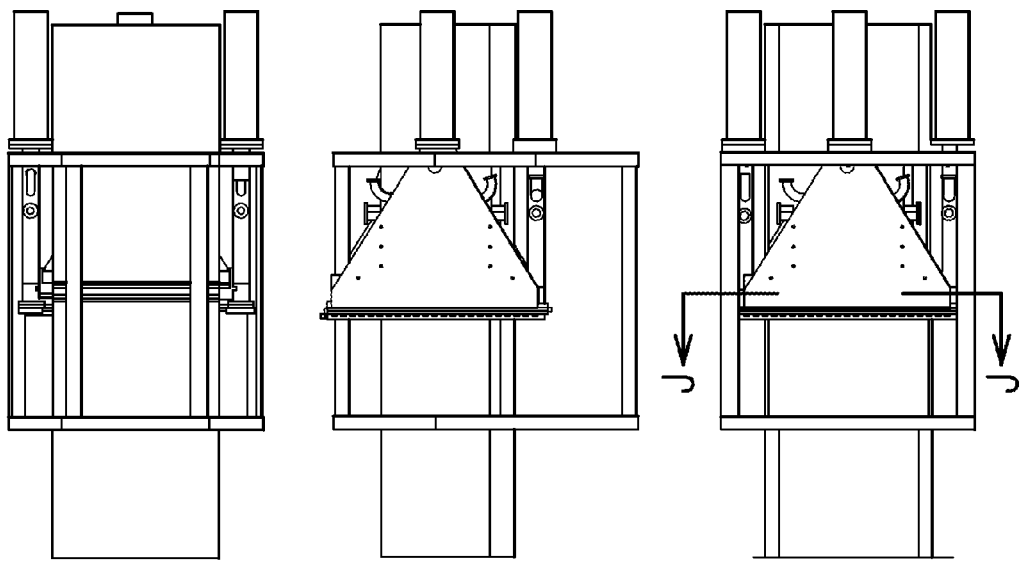
FIG. 15

RECONSTRUCTION METHOD USING DIRECT AND ITERATIVE TECHNIQUES

CROSS-REFERENCE TO RELATED APPLICATIONS

The present application claims the benefit under 35 U.S.C. §119(e) of U.S. Provisional Application Ser. No. 61/438,560, filed on Feb. 1, 2011, titled "Reconstruction Method Using Direct and Iterative Techniques," which is hereby incorporated by reference in its entirety.

BACKGROUND

X-ray imaging technology has been employed in a wide range of applications from medical imaging to detection of unauthorized objects or materials in baggage, cargo or other containers generally opaque to the human eye. X-ray imaging typically includes passing high-energy radiation (i.e., X-rays) through an object to be imaged. X-rays from a source passing through the object interact with the internal structures of the object and are altered according to various characteristics of the material (e.g., transmission, scattering and diffraction characteristics, etc.). By measuring changes (e.g., attenuation) in the X-ray radiation that exits the object, information related to material through which the radiation passed may be obtained to form an image of the object.

In order to measure X-ray radiation penetrating an object to be imaged, an array of detectors responsive to X-ray radiation typically is arranged on one side of the object opposite a radiation source. The magnitude of the radiation, measured by any detector in the array, represents the density of material along a ray from the X-ray source to the X-ray detector. Measurements for multiple such rays passing through generally parallel planes through the object can be group into a projection image. Each such measurement represents a data point, or "pixel," in the projection image.

Projection imaging is well suited for finding objects that have material properties or other characteristics such that they produce a group of pixels having a recognizable outline regardless of the orientation of the object to be imaged. However, projection images are not well suited for reliably detecting or characterizing objects that have at least one relatively thin dimension, particularly if these objects may be packaged with other objects, as often occurs in security inspection scenarios. If the rays of radiation pass through only a thin portion of the object or pass through multiple objects, there may be no group of pixels in the projection image that has characteristics significantly different from other pixels in the image. The object may not be well characterized by, or even be detected in, the resultant projection image.

Measuring attenuation of X-rays passing through an object from multiple different directions can provide more accurate detection of relatively thin objects. For instance, in a CT scanner such measurements are obtained by placing the X-ray source and detectors on a rotating gantry. An object to be imaged passes through an opening in the center of the gantry. As the gantry rotates around the object, measurements are made on rays of radiation passing through the object from many different directions. Another example is the MVT™ imaging system sold by L-3 Communications Security and Detection Systems, Inc., of Woburn, Mass. The MVT™ system employs multiple source-detector pairs and each pair is positioned to form a projection image of an irradiated object from a different angle. In both cases, multiple projection images of the object are obtained.

Multiple projection images can be used to construct a three-dimensional, or volumetric, image of the object. A volumetric image is organized in three-dimensional sub-blocks called "voxels"—analogous to pixels in a two-dimensional image—with each voxel corresponding to a density (or other material property) value of the object at a location in three-dimensional space. Even relatively thin objects may form a recognizable group of voxels in such a volumetric image.

The process of using multiple radiation measurements from different angles through an object to compute a volumetric image of the object is herein referred to as volumetric image reconstruction. The quality of volumetric image reconstruction not only depends on the geometry of the imaged object, but also on the geometry of the imaging system including the relative positions of X-ray sources and detectors used to make the measurements. The relative positions of sources and detectors control the set of angles from which each voxel is irradiated by X-rays.

Conventional approaches to volumetric image reconstruction fall into one of two classes: direct reconstruction methods based on formal mathematical solutions to the problem and iterative reconstruction methods, which calculate the final image in a sequence of small steps. Examples of direct reconstruction methods include filtered back projection and Fourier reconstruction, while examples of iterative reconstruction methods include the Algebraic Reconstruction Technique (ART) and the Simultaneous Iterative Reconstruction Technique (SIRT).

SUMMARY

The inventors have recognized and appreciated that an inspection systems may be manufactured in a cost effective manner, but still produce accurate images using a combination of direct reconstruction and iterative mathematical techniques. Such as system may use a direct reconstruction technique to generate an image that serves as an initial estimate for the iterative technique.

In one aspect, the invention relates to a computational method for deriving a volumetric image from measurements of a material property of an object under inspection made from multiple different directions. In one embodiment, the computational method involves estimating an initial volumetric image of an object using a direct reconstruction technique. Thereafter, the estimate is iteratively improved, using an iterative reconstruction method, until the estimate results in an image within an acceptable error. Such a method may be executed in one or more computers. Such a method may be embodied in a computer readable medium with a program for executing on a computer.

In another aspect, the invention relates to an improved object imaging system. The system may form volumetric images using components that are simpler and lower cost than conventional imaging systems because the constraints on the geometry of X-ray sources and detectors are less rigid. In one embodiment, this system employs multiple radiation sources and detector arrays, allowing attenuation measurements to be made on an imaged object from multiple different directions. Attenuation measurements are made as the object moves past the sources and detectors, allowing the imaging system to gather measurements from multiple angles on all of the voxels in the object. These measurements may be processed to form a volumetric image of the item under inspection.

The system may include imaging components with characteristics that may not satisfy geometry requirements for accurate direct reconstruction. In some embodiments, a system may include a plurality of separate radiation sources at multiple locations around a tunnel where an item under inspection may be located. These sources may have gaps between them or may be shaped and positioned such that they do not emit radiation uniformly from at least 180 degrees of arc around the tunnel.

Accordingly, in some embodiments, a computer-implemented method for deriving a full-volume volumetric image of an object being imaged is disclosed. The method comprises calculating a first volumetric image of the object using a direct reconstruction method from a plurality of radiation measurements of the object taken from a plurality of directions, wherein calculating the first volumetric image comprises calculating a value for each voxel in the first volumetric image. The method further comprises performing at least one iteration of a nonregulating iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein performing the at least one iteration comprises calculating a value for each voxel in the second volumetric image.

In some embodiments, a system for deriving a full-volume volumetric image of an object is disclosed. The system comprises at least one processor configured to calculate a first volumetric image of the object using a direct reconstruction method from a plurality of radiation measurements of the object taken from different directions, wherein the at least one processor is configured to calculate the first volumetric image by calculating a value for each voxel in the first volumetric image. The processor is also configured to perform at least one iteration of a nonregulating iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein the at least one processor is configured to perform the at least one iteration by calculating a value for each voxel in the second volumetric image.

In some embodiments, at least one computer-readable medium is disclosed. The at least one computer-readable medium stores processor-executable instructions that when executed by at least one processor perform a method for deriving a full-volume volumetric image of an object being imaged. The method comprises calculating a first volumetric image of the object using a direct reconstruction method from a plurality of radiation measurements of the object taken from different directions, wherein calculating the first volumetric image comprises calculating a value for each voxel in the first volumetric image. The method also comprises performing at least one iteration of an iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein performing the at least one iteration comprises calculating a value for each voxel in the second volumetric image.

In some embodiments, a system for deriving a full-volume volumetric image of an object is disclosed. The system comprises at least one processor configured to calculate a first volumetric image of the object using a direct reconstruction method from a plurality of radiation measurements of the object taken from different directions, wherein the at least one processor is configured to calculate the first volumetric image by calculating a value for each voxel in the first volumetric image. The at least one processor is also configured to perform at least one iteration of an iterative reconstruction method at least in part by calculating a measure of error in the projection image domain between the first volumetric image and the plurality of radiation measurements and updating the first volumetric image based on a quantity depending only on the calculated measure of error to compute a second volumetric image of the object, wherein the second volumetric image comprises a corresponding voxel for each voxel in the first volumetric image, and wherein computing the second volumetric image comprises calculating a value for each voxel in the second volumetric image.

The foregoing is a non-limiting summary of the invention, which is defined by the attached claims.

BRIEF DESCRIPTION OF THE DRAWINGS

FIG. 3 illustrates a computation performed at a step in an iterative method of computing a volumetric image, in accordance with some embodiments of the present disclosure;

FIG. 4 illustrates a computation performed at a step of an iterative method of computing a volumetric image, in accordance with some embodiments of the present disclosure;

FIG. 5 illustrates a computation performed at a step of an iterative method of computing a volumetric image, in accordance with some embodiments of the present disclosure;

FIGS. 8-16 illustrate various portions of an x-ray scanning system using dual, steered electron beam radiation sources, in accordance with various embodiments of the present invention.

DETAILED DESCRIPTION

Embodiments of the present disclosure may be used to form a volumetric image of an object imaged by an imaging system. The methods for constructing volumetric images described hereinafter may be applied to any of numerous imaging systems including medical imaging systems and inspection systems for imaging cargo and luggage. One such inspection system is illustrated in FIG. 1.

Figure 1:
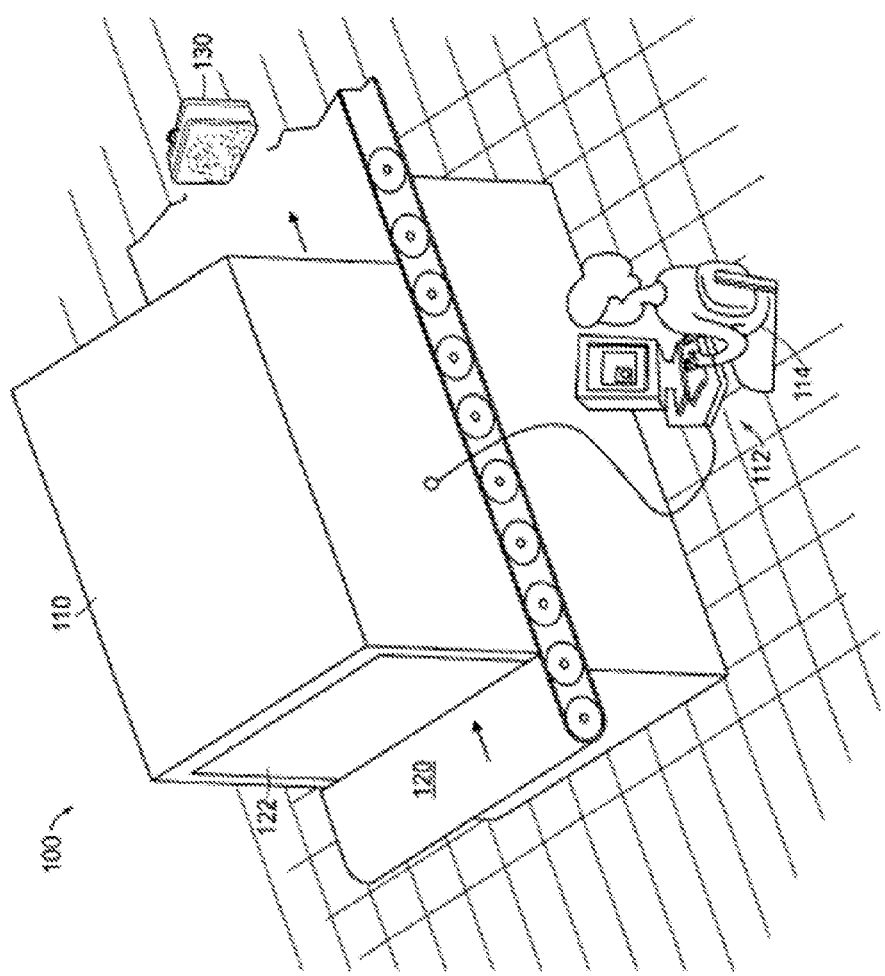
FIG. 1 is a sketch of a security checkpoint employing an imaging inspection system, in accordance with some embodiments of the present disclosure.

FIG. 1 illustrates a security checkpoint 100 at which an illustrative imaging system for inspecting objects may be employed. Checkpoint 100 may be a check point used at any facility at which it is desired to create a secured area. For example, at an airport, checkpoint 100 may be located at the entrance to boarding gates. In such an embodiment, passenger carry on luggage may be inspected at checkpoint 100. Alternatively, checkpoint 100 may be positioned at an airport to inspect checked baggage before it is loaded on airplanes. However, an inspection system according to embodiments of the invention is not limited for use at airports, and checkpoint 100 may be a checkpoint located in any suitable setting.

Checkpoint 100 includes inspection system 110. As described in greater detail below, inspection system 110 produces volumetric images of items under inspection. In the example of FIG. 1, item under inspection 130 is pictured as a suitcase. However, inspection system 110 may operate on any suitable type of item under inspection, such as other forms of luggage, carry-on items, parcels, or any other container in which contraband objects, or any other objects of interest, may be concealed.

In the embodiment shown, inspection system 110 includes a conveyor 120. Items under inspection 130 are placed on conveyor 120 and moved through tunnel 122. Within tunnel 122, x-ray sources are positioned to direct radiation at items on conveyor 120. Detector arrays are positioned to receive radiation from the x-ray sources after the radiation has passed through an item under inspection.

Measurements of the detector outputs can be used to form a volumetric image of the item under inspection. Outputs of the detector arrays may be passed to computer 112. Computer 112 processes the outputs of the detectors to form a volumetric image of each item under inspection. Each volumetric image may be analyzed to detect suspicious regions within the image.

The volumetric image may be formed from radiation measurements from multiple directions of the item under inspection. Volumetric image reconstruction methods may be applied to the plurality of measurements obtained by the detectors to form the volumetric image.

Any of suitable volumetric image reconstruction methods may be applied to form the volumetric image of an item under inspection from multiple radiation measurements from different angles of the item, including techniques as are known in the art. For example, direct reconstruction approaches such as filtered back projection, the analytic cone beam method, the approximate cone beam method and Fourier reconstruction may be applied to form the volumetric image. Alternatively, iterative reconstruction approaches such as the algebraic reconstruction technique, iterative reweighted least squares, and expectation maximization may be applied. Still another approach is to combine any of the direct reconstruction approaches with any of iterative volumetric image reconstruction approaches to form the volumetric image. For instance, a volumetric image formed by a direct reconstruction approach may be used to initialize an iterative reconstruction method, which, in turn, improves the provided volumetric reconstruction image at each iteration.

The volumetric image may depict a characteristic of an item under inspection. For example, the magnitude of the radiation received may be compared to the magnitude of the radiation emitted by the x-ray sources to determine attenuation of the radiation within the item under inspection. Attenuation is a function of density of the item. Accordingly, forming the image using attenuation measurements may result in a volumetric image depicting the density of objects within the item under inspection.

Other material properties may alternatively or additionally be depicted in a volumetric image. For example, the ratio of attenuation of radiation at different energy levels can indicate atomic number of material through which the radiation passes. Accordingly, if the source emits radiation of at least two energies and the detectors can be operated to measure attenuation of radiation of these different energies. A ratio of attenuations may be depicted in the image, in which case the volumetric image may represent the atomic number of objects within the item under inspection.

In some embodiments, measurements may be represented using basis function decomposition. The sum of the weighted basis functions may represent the spatial function of object properties, for instance either density, or effective atomic number. In such an embodiment, the values in the volumetric image may represent weighting of basis functions computed during the decomposition.

In yet further embodiments, an image may represent a combination of characteristics. For example, both density and atomic number could be represented in an image. Thus, the specific characteristic measured and the interpretation of that characteristic is not a limitation on the invention.

Image analysis may be performed by displaying a visual representation of the image for a human operator 114. Additionally, computer processing within computer 112 may process the volumetric images using automatic detection algorithms to identify suspicious regions. In the embodiment illustrated in FIG. 1, once suspicious regions are identified by computer processing, those regions are highlighted in a visual image displayed for human operator 114. However, in other embodiments, image processing may be performed solely by a human operator 114. In yet other embodiments, image processing may be performed solely by a computer. Accordingly, the nature of image processing performed is not a limitation on the invention and any suitable type of image processing may be performed.

In the embodiment illustrated, computer 112 is shown as a desktop computer workstation located at checkpoint 100. However, the type and location of computer 112 is not a limitation on the invention. For example, computer 112 may be integrated into the chassis of inspection system 110. Alternatively, computer 112 may be connected to inspection system 110 over a network link. If computer 112 is connected over a network link, computer 112 may be located at any suitable location reachable by the network and does not need to be physically located at checkpoint 100. Further, computer 112 is shown as a single computer. However, a collection of one or more computers may be used to process data collected by inspection system 110. If processing is performed in multiple computers, it is not necessary that the computers be located together. Accordingly, computer 112 should be understood to represent one or more computer processors located in any suitable location or locations that may perform processing on the data collected by inspection system 110.

Figure 2:
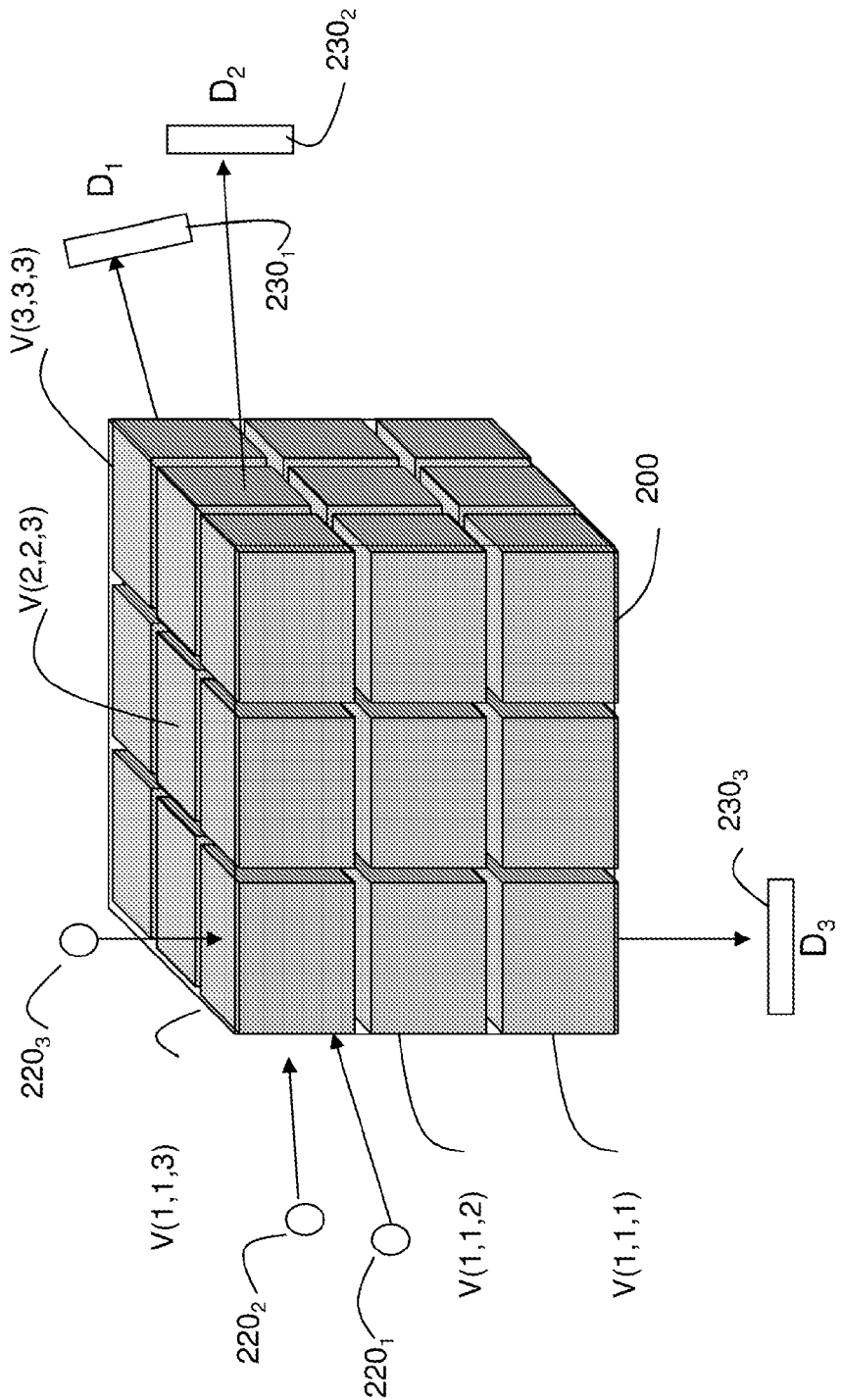
FIG. 2 is a sketch illustrating aspects of forming a multiview volumetric image, in accordance with some embodiments of the present disclosure.

FIG. 2 is a sketch demonstrating aspects of computing a volumetric image from measurements made on an item under inspection 200. In the simple example of FIG. 2, the item under inspection 200 is divided into nine regions. An image of item under inspection 200 is formed by computing a property of the material in each of these nine regions. Each of the nine regions will correspond to a voxel in the computed volumetric image. For this reason, the regions in the item under inspection are sometimes also referred to as "voxels," and the volumetric image is sometimes referred to as comprising voxels, akin to a two-dimensional image comprising pixels. In the simple example of FIG. 2, item under inspection 200 is divided into nine voxels of which V(1,1,1), V(1,1,2), V(1,1,3), V(2,2,3) and V(3,3,3) are numbered. To form a volumetric image of item under inspection 200, a material property is computed for each of the voxels from the measured outputs of detectors, of which detectors $230_1$, $230_2$ and $230_3$ are shown. In the illustrated embodiment, the material property is an average density of the material within the voxel.

In the embodiment illustrated, measurements from which density may be computed are made by passing rays of radiation through item under inspection 200 from different directions. By measuring the intensity of the rays after they have passed through the item under inspection and comparing the measured intensity to incident intensity, attenuation along the path of the ray may be determined. If attenuation along a sufficient number of rays traveling in a sufficient number of directions is measured, the data collected can be processed to compute the density within each of the voxels individually.

For example, FIG. 2 shows a source $220_1$ and a detector $230_1$. A ray traveling from source $220_1$ to detector $230_1$ passes through voxels V(1,1,3), V(2,2,3) and V(3,3,3). As a result, the value measured at detector $230_1$ will depend on the densities in each of those voxels. Thus, the measurement taken at detector $230_1$ of a ray from source $220_1$ may be used to estimate the density at each of the voxels V(1,1,3), V(2,2,3) and V(3,3,3).

As shown, a ray from source $220_1$ to detector $230_1$ represents just one of the rays passing through item under inspection 200. Other rays are shown in the example of FIG. 2. For example, a ray is shown passing from source $220_2$ to detector $230_2$. As with the ray passing from source $220_1$ to detector $230_1$, the value measured at detector $230_2$ will depend on the densities of voxels V(1,1,3), V(2,2,3) and V(3,2,3) because the ray source $220_2$ passes through these voxels before impinging on detector $230_2$. Similarly, the value measured at detector $230_3$, with respect to a ray passing from passing from source $220_3$ to detector $230_3$, is influenced by the densities of the voxels along that ray (V(1,1,1), V(1,1,2), and V(1,1,3)).

FIG. 2 shows only three rays passing through item under inspection 200. Each of the rays generates a single measurement representative of the densities of voxels, through which the ray passes, in item under inspection 200. In the simple problem illustrated in FIG. 2, item under inspection 200 is divided into 27 voxels. Accordingly, though FIG. 2 shows only three rays passing through item under inspection 200, to compute a volumetric image of item under inspection 200, more measurements are typically needed.

In a physical system, the number of measurements taken will likely exceed the number of voxels in the image. For instance, measurements may be made such that multiple rays pass through each voxel with some of the rays passing through each voxel from a range of angles. The range of angles may be any suitable range. For example, it may be desirable to have rays passing through the item under inspection from a range of angles that exceeds 180°, or a range of angles that is as close to 180° as possible. Though in other scenarios the range of angles may be smaller, for instance a range such less than 140°, 150°, 160°, or 170° may be used.

Measurements obtained from multiple rays passing through the object under inspection may be used to compute a volumetric image. For instance, if a sufficient number of measurements along rays from a sufficient number of independent angles are made, the measured outputs of the detectors may be used to define a system of simultaneous equations that, using an iterative mathematical technique, may be solved for the unknown values representing the densities of the individual voxels in the item under inspection 200. Though uncertainty or other variations in the measurement process may prevent a single solution from satisfying simultaneously all equations in a system of equations formed from the measurements. Thus, solving the system of equations formed from actual measurements would involve finding the values that best solve the equations. Similarly, obtaining measurements from multiple angles will allow voxels to be computed using a direct method.

FIG. 3 illustrates an example of an iterative method, termed the algebraic reconstruction technique (ART) for computing a value $\rho$ for each of the voxels in the item under inspection. The process of FIG. 3 illustrates that a maximum likelihood estimate, represented as $M^2$, is computed. In the equations of FIG. 3, the system parameters are reflected by $X_i$ that relates density at voxels through which a ray passes to a measured value of the ray that has passed through the item under inspection. In the equation, estimated voxel densities are multiplied by $X_i$, which yields an estimate of values measured along the $i^{th}$ ray. By subtracting this estimate from the actual measured value $\chi_i$, an error value is obtained. When these error values are weighted by an uncertainty value $\sigma_i$, squared and summed with similarly computed values along other rays, a value of $M^2$ results. The iterative method aims to find density values that minimize the changes in $M^2$ with respect to changes in density values. Density values that satisfy this criterion represent the computed image.

FIG. 4 further describes how ART is used to finding values that maximize the likelihood that an image vector solves a system of equations developed from measurements of radiation passing through an item under inspection. The iterative solution may start with an initial guess of the vector representing the densities of the voxels. In the embodiment pictured in FIG. 4, a uniform density in each voxel is used as an initial estimate of the image vector. Thereafter, values of the densities in each of the voxels are computed iteratively by finding values that maximize the likelihood that the computed density values correctly solve the system of equations derived from measured outputs of the detectors. At each iteration, a discrepancy of the estimated value of the vector $\rho$ is computed. This discrepancy is depicted in FIG. 4 by the quantity $\Delta\rho_i$.

The discrepancy vector is used to compute the estimated value of $\rho$ for the next iteration, which in FIG. 5 is denoted $\rho'$. As shown in FIG. 5, the value of $\rho'$ is computed as the sum of $\rho$, the prior estimate of the density vector, plus the discrepancy value $\Delta\rho$ multiplied by a relaxation value $\lambda$.

Using a relaxation value $\lambda$ prevents the iterative computation from diverging or oscillating. A relaxation value $\lambda$ may be selected in any suitable way. FIG. 5 shows an equation for computing $\lambda$.

The Algebraic Reconstruction Technique described with reference to FIGS. 3-5 is only one of many volumetric iterative reconstruction methods known in the art. Any of numerous iterative reconstruction techniques may be used instead of or in addition to ART. For instance, any of the following methods may be used: ordered subset maximum likelihood method (OSC), simultaneous algebraic reconstruction technique (SART), simultaneous iterative reconstruction technique (SIRT), least-squares QR method, expectation maximization (EM), ordered subset convex method, and ordered subset expectation maximization (OSEM).

As discussed with respect to FIG. 4, ART may be initialized by starting the iterations from an initial guess of voxel densities. The initial guess may be any of numerous voxel densities. For instance, ART may be initialized with a constant density in each voxel. It should be appreciated that any of the previously-mentioned iterative volumetric image reconstruction methods may be initialized with an initial guess of voxel densities.

In some embodiments, an iterative volumetric image reconstruction method (e.g., ART, SART, OSEM) may be initialized with an initial estimate of a volumetric image of the imaged object. Such an initial estimate may be a close approximation to the actual image values, so that the iterative processing based on that initial estimate of the image vector may require a relatively small number of iterations to converge to an acceptable solution. On the other hand, initializing an iterative reconstruction method using a uniform density across voxels may, in turn, necessitate many iterations before the method converges to an accurate image.

The inventors have appreciated that initializing an iterative reconstruction technique with an initial volumetric image estimate may result in fewer overall iterations to obtain an accurate final volumetric image. This may be important in situations when a high-resolution volumetric image (i.e., an image having a high voxel density) is needed, because many iterations may be required to converge to an accurate volumetric image of the imaged target. Generally, computing an accurate high-resolution volumetric image may require more iterations than computing an accurate lower-resolution volumetric image. In some embodiments, a high-resolution volumetric image may have voxels on the order of five cubic millimeters or less. In other embodiments, the voxels may be on the order of one cubic millimeter or less.

The computational expense of performing a large number of iterations to compute a high-resolution volumetric image may be a drawback to using iterative reconstruction methods in isolation, because many imaging systems, such as luggage inspection systems deployed in airports, must be able to image objects quickly. For instance, it is expected that passenger luggage be imaged in less than three seconds to accommodate the high volume of baggage that needs to be scanned every day. The combination of operational time constraints and the computational demands of iterative methods effectively limits the resolution at which an object may be practicably imaged—potentially leading to breaches in security when aspects of an item in the luggage (e.g., explosive) are not accurately reconstructed.

Any suitable method may be used to provide an initial volumetric image estimate to an iterative reconstruction technique. For instance, a direct volumetric reconstruction method such as filtered back projection (FBP) or Fourier reconstruction may be used. Alternatively, direct reconstruction methods such as the analytic cone beam method or the approximate cone beam method may be used. Alternatively, multiple volumetric images using different direct reconstruction methods may be computed first, and the initial volumetric image estimate may be selected among these images based on a suitable error criterion. Though methods other than direct reconstruction methods may be used to provide an initial volumetric estimate, as the embodiments are not limited in this respect.

It may be advantageous to initialize an iterative volumetric image reconstruction method with an estimate computed by a direct volumetric image reconstruction method because direct reconstruction methods may be implemented efficiently. Computing an initial estimate with a direct method may require less processing than computing an initial estimate with an alternative iterative technique.

Figure 6:
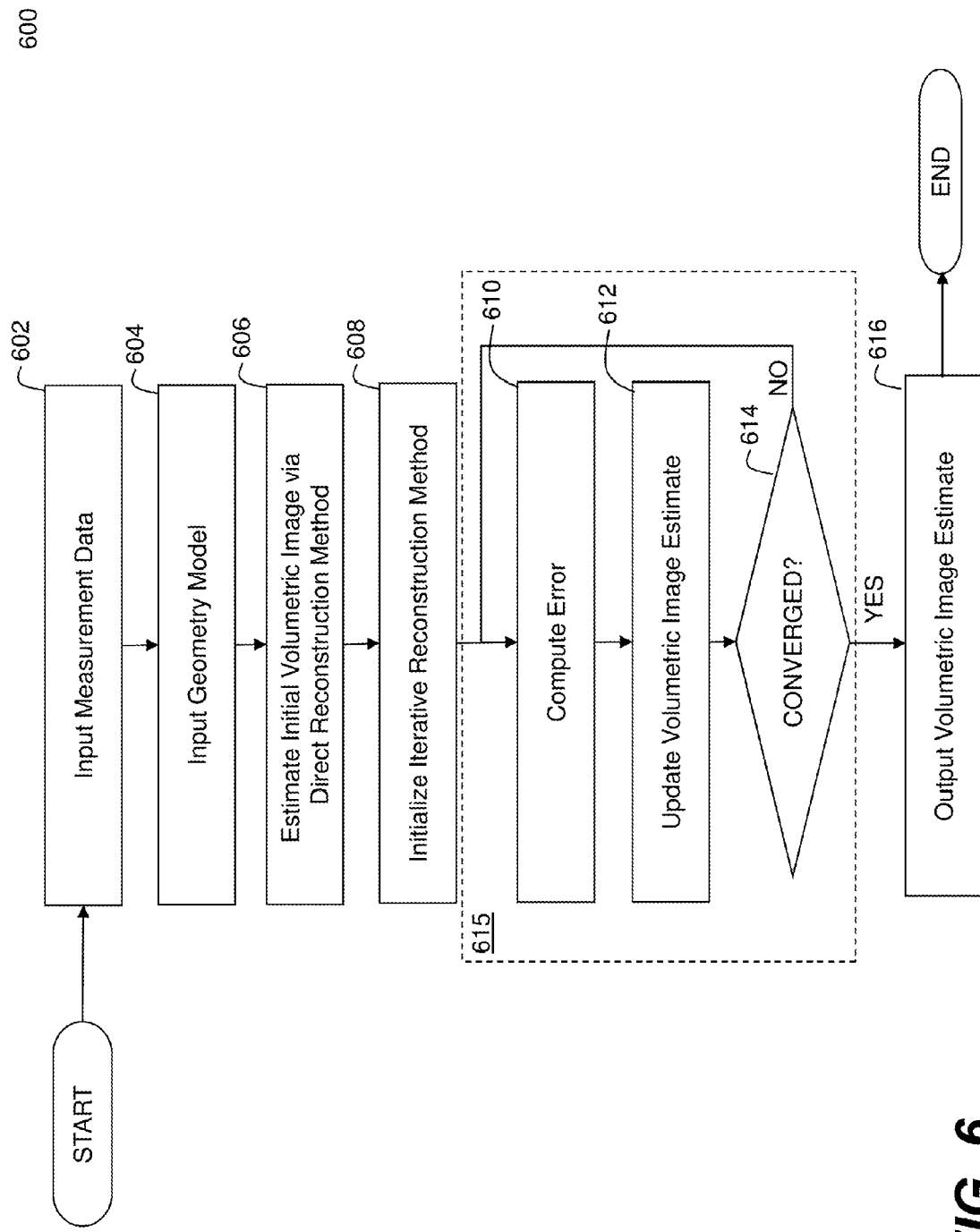
FIG. 6 is a flow chart of a process of computing a volumetric image, in accordance with some embodiments of the present disclosure.

FIG. 6 shows a flow chart of an illustrative process 600 for computing a volumetric image from input radiation measurement data by initializing an iterative reconstruction method with an initial volumetric image estimate. The process 600 begins, in act 602, with the input of multiple radiation measurements of an imaged object, obtained from different angles. Any of numerous ways of multiple radiation measurements of the imaged object may be used. For instance, the projection images may be obtained by one or more radiation sources arranged in an imaging system. Alternatively, the measurements may be obtained by a one or more sources rotating about a target, as in a CT scanner.

Regardless of how the radiation measurements of the imaged object, inputted at act 602, are obtained by an imaging system, a geometry model of the imaging system may be inputted at act 604, of the process 600. The geometry model may comprise information related to the positions of sources and detectors in the imaging system as well as information about the position of the imaged object relative to the sources and detectors. The geometry information may further comprise a range of angles for each voxel, such that the range of angles specifies the set of directions from which radiation (e.g., X-rays) may pass through the voxel prior to impinging on a detector. Still, other information may be included in the geometry model. For instance, the geometry model may comprise information about what parts of the imaged object may be occluded from view or what parts of the imaged object may have been subjected to truncation in some or all the measurement data. The geometry model may be required in order to implement any of the volumetric image reconstruction techniques (direct or iterative) in subsequent acts of the process 600. A geometry model may be obtained using techniques as are known in the art, including by measuring characteristics of an inspection system or computations based on a design of the system.

Next, an initial volumetric image may be estimated from the inputted multiple radiation measurements by using a direct reconstruction method, in act 606 of the process 600. Any suitable direct reconstruction technique may be used including techniques as are known in the art. For instance, filtered back projection, Fourier reconstruction, and analytic/approximate cone beam methods may be used. Though any other direct reconstruction method known to those skilled in the art may be used. In some instances, the direct reconstruction technique may use information contained in the geometry model inputted at act 604. In other instances, such information may not be required.

Next, in act 608, an iterative reconstruction method may be initialized with the initial volumetric image computed, in act 606, by a direct reconstruction technique. As such, the iterative reconstruction method may, in each iteration, calculate an updated volumetric image that comprises one or more corresponding voxels for each voxel in the initial volumetric image. Thus, the iterative reconstruction method may, in each iteration, calculate a value for each of the voxels in the updated volumetric image.

An updated volumetric image comprising one or more corresponding voxels for each voxel in the initial volumetric image may be referred to as a "full-volume" volumetric image. The correspondence may be a many-to-one correspondence such that multiple voxels in the updated volumetric image may correspond to a single voxel in the initial volumetric image. For example, the updated volumetric image may be a higher-resolution image than the initial volumetric image. In some embodiments, the full volume volumetric image may be a volumetric image of an entire object being imaged. Though, in other embodiments, the full volume volumetric image may be a volumetric image of a portion of the object being imaged.

The iterative reconstruction method may be any of numerous previously-mentioned iterative reconstruction methods including algebraic reconstruction technique, simultaneous algebraic reconstruction technique, expectation maximization, ordered-subset expectation maximization. Though any other iterative reconstruction method known to those skilled in the art may be used.

At block 610, an estimate of the error in the estimated volumetric image is determined. Any suitable approach for computing the error in an estimate may be used at block 610 including using techniques as are known in the art. In some embodiments, an error may be computed by comparing a "forward projection" of the estimated volumetric image to actual measurements. The forward projection is a computation of the measured values that would result if the item under inspection had the material characteristics (e.g., voxel density) indicated by the estimated image vector. One skilled in the art would understand that when the error is calculated by using a forward projection, this calculation is performed in the projection image domain.

Once the initial estimate and the error associated with the initial estimate are computed, processing proceeds to block 612, which is the beginning of the first iteration in which the estimated volumetric image is updated in accordance with the iterative reconstruction method used. In some embodiments, the computed error may be used to compute an adjustment to the image vector that should cause the forward projection to more closely match the actual measurements in the projection image domain. The amount of the adjustment may be proportional to the error.

When updating the estimate, one or more regulators may be used. Regulators may aid in converging the estimated image vector to a desired solution. Other types of regulators are possible and may be used instead of or in addition to regulators described above. For example, regulators may be used that impose a specific form of solution on the updated estimate of the image vector. These regulators may require that any estimated image vector be consistent with physical constraints. For example, a regulator may be imposed that requires all values in an estimated image vector to reflect a positive density. Other regulators may require regions of an image vector corresponding to a single object to have values indicating a uniform density. Similarly, a regulator could be imposed that requires regions of an image vector corresponding to empty space to have a uniform value, such as zero density. The specific form of regulator that may be used is not limited by the specific examples given above and any suitable regulator may be used.

Though, it should be appreciated that in some embodiments, the estimate may be updated without using any regulators. In this case, the iterative reconstruction method may be referred to as a "nonregulating" iterative reconstruction method. When the estimate is updated without using any regulators, the estimate may be updated based on a quantity which depends only on the error computed in act 310.

At decision block 614, the process 600 branches depending on whether the computation has converged to an acceptable solution. Any suitable method may be used to determine whether the computation of the image vector has converged. For example, the process may be deemed to have converged if the computed error is below a threshold. Alternatively, convergence may be determined based on the magnitude or percentage change from one iteration to the next.

If the processing has not converged, the process loops back to block 610 where the error in the estimate of the image vector is again computed. Processing at blocks 612 and decision block 614 is repeated, to determine again whether or not the updated estimate represents an acceptable solution. Processing proceeds iteratively in this fashion until an updated estimate meets criteria defined to indicate an acceptable estimate has been computed. When, as determined at decision block 614, the iterative computation in sub process 615 has converged to an acceptable solution, final volumetric image is output in act 616, and the process 600 terminates.

The output volumetric image may be used in any suitable way, depending on the imaging system. For instance, if the imaging system is an airport luggage screening system, the output image may be used to clear a piece of luggage to go through or present an alarm indicating the presence of a suspicious article within the piece of luggage. However, the image may be used in any other suitable way.

It should be appreciated, that the process 600 may be used to improve or refine any volumetric image estimated by a direct reconstruction method such as filtered back projection. Direct reconstruction methods produce accurate volumetric images of an imaged object only when a stringent set of geometric constraints on the imaging system is met. For instance, in a conventional system using a direct reconstruction technique alone, each voxel may be imaged from a range of angles greater than or substantially close to 180°, to produce an accurate volumetric image of an imaged object. However, the process 600 may be used to refine a volumetric image estimated by a direct reconstruction method without regard to whether the imaging system satisfies any such geometric constraints. The process 600 may be used in cases when the range of angles at which some or all voxels are irradiated may be less than 180°. The range of angles may be less than 140°, 150°, 160°, 170° or 180°.

In some embodiments, only a few iterations of an iterative reconstruction method 615 may be required to improve an initial volumetric image produced by a direct reconstruction method. For instance, one iteration may be employed, or any small number of iterations may be employed, wherein a small number is any positive number between 2 and 20. Though in other embodiments, many iterations may be used.

Using the process 600 for estimating volumetric images using iterative reconstruction techniques initialized with image estimates produced by direct reconstruction methods may be valuable in a number of imaging systems. For instance, the process 600 may be valuable in any imaging system which does not satisfy a set of geometric constraints that are typically required to produce accurate volumetric images of an imaged object by using direct reconstruction methods. Additionally, the process 600 may be valuable in any imaging system that aims to produce high-resolution volumetric images in a time-efficient manner.

One skilled in the art would recognize that such geometric constraints are one of numerous examples of volumetric reconstruction requirements typically required to produce accurate volumetric images of an imaged object by using direct reconstruction methods. Other examples of volumetric reconstruction requirements known in the art include, but are not limited to, satisfying the pi-line condition in some or all views, satisfying the Tuy condition in some or all views, satisfying the Nyquist condition in some or all views, and/or satisfying a non-truncation condition in some or all views. As such, volumetric reconstruction requirements typically required to produce accurate volumetric images may be specified by using at least one or more of the above-mentioned conditions. It should be appreciated that process 600 may be valuable in any imaging system which does not satisfy at least one of the above-mentioned examples of volumetric reconstruction requirements. In particular, process 600 may be valuable in any imaging system that does not satisfy any of the above-mentioned examples of volumetric reconstruction requirements.

It should also be appreciated that the above-mentioned conditions are known in the art. As such, more details about the pi-line condition may be found in Y. Zou and X. Pan, "Exact image reconstruction on PI-lines from minimum data in helical cone-beam CT," Phys. Med. Biol. vol. 49, 941, published in 2004, which is hereby incorporated by reference in its entirety. More details about the Tuy condition may be found in H. K. Tuy, "An inversion formula for cone-beam reconstruction," SIAM J. Appl. Math. vol. 43 pp. 546-552, published in 1983, which is hereby incorporated by reference in its entirety. More details about the Nyquist condition may be found in Hasegawa, "Physics of Medical X-ray Imaging," chapter 3, Medical Physics Pub Corp, published in 1987, which is hereby incorporated by reference in its entirety. More details about the non-truncation condition may be found in Mawlawi et al., "Truncation Artifact on PET/CT: Impact on Measurements of Activity Concentration and Assessment of a Correction Algorithm," American Journal of Roentgenology, vol. 186, pp. 1458-1467, published in 2006, which is hereby incorporated by reference in its entirety.

For instance, the volumetric image reconstruction techniques described herein may be applied to broad range of imaging systems such as the previously-mentioned MVT™ imaging system sold by L-3 Communications Security and Detection Systems, Inc., of Woburn, Mass. Another example comprises an electron-beam (e-beam) X-ray system.

In e-beam imaging systems, one or more e-beams are directed to impinge on the surface of a target responsive to the e-beams. The target may be formed from, for example, tungsten, molybdenum, gold, or other material that emits X-rays in response to an electron beam impinging on its surface. For example, the target may be a material that converts energy in the e-beam into relatively high energy photons, emitted from the target essentially in the $4\pi$ directions. The released energy may be shaped or collimated by blocking selected portions of the X-rays emitted from the target using any of various radiation absorbing material (such as lead). For example, the X-ray may be collimated to form a cone beam, a fan beam, a pencil beam or any other X-ray beam having generally desired characteristics. The collimated X-rays may then pass into an inspection region to penetrate an object of interest to ascertain one or more characteristics of the object.

While conventional X-ray scanning systems employ one or more sources and detectors positions or rotated in a circular geometry, e-beam imaging systems may comprise arbitrary, and more particularly, non-circular geometries, which offers a number of benefits with respect to the flexibility of the design and may facilitate more compact and inexpensive X-ray detection system. Applicant has identified and developed various e-beam techniques for use in arbitrary geometry systems that facilitate relatively inexpensive, compact and efficient X-ray detections systems.

In one exemplary X-ray scanning system, X-rays may be generated by directing an e-beam along a target via a scanning path that includes at least one substantially circular portion and at least one non-circular portion. The system includes a scanning path having a plurality of substantially linear portions and a plurality of substantially circular portions. For example, the scanning path may traverse a substantially rectangular U-shaped target formed from three substantially linear segments connected by substantially circular segments.

In another exemplary X-ray scanning system, the target which converts energy in an e-beam to X-ray energy may be provided as a plurality of segments. In one exemplary configuration, the target comprises at least one substantially circular segment and at least one substantially linear segment. In some embodiments, the plurality of segments are provided continuously. In other embodiments, at least one of the plurality of segments is provided discontinuous with at least one other segment. For example, each segment may be offset in a direction parallel to the direction of conveyance of an item being inspected by the X-ray scanning system.

Figure 7:
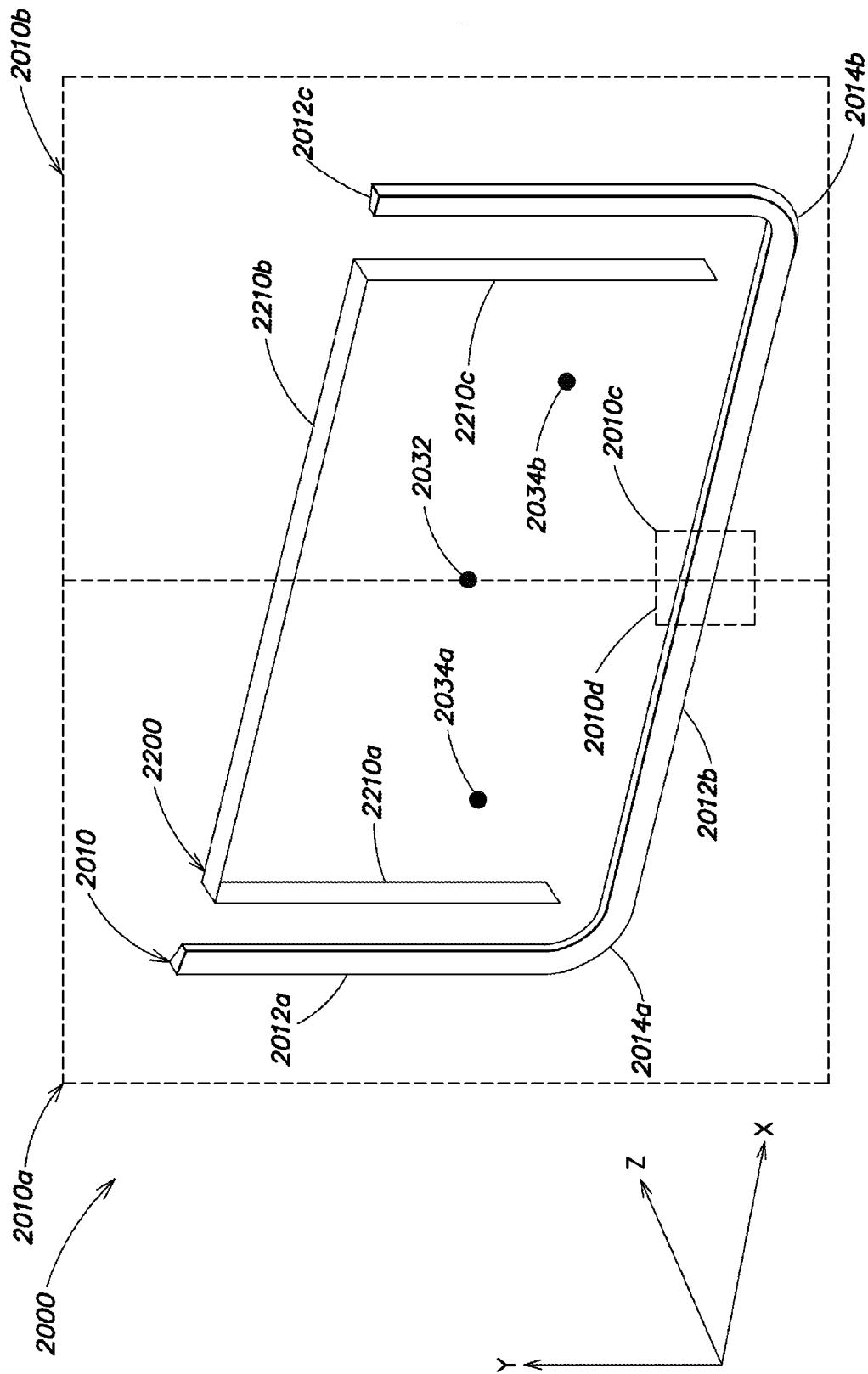
FIG. 7 illustrates an arbitrary geometry target and a detector using e-beam technology, in accordance with some embodiments of the present disclosure.
Figure 8:
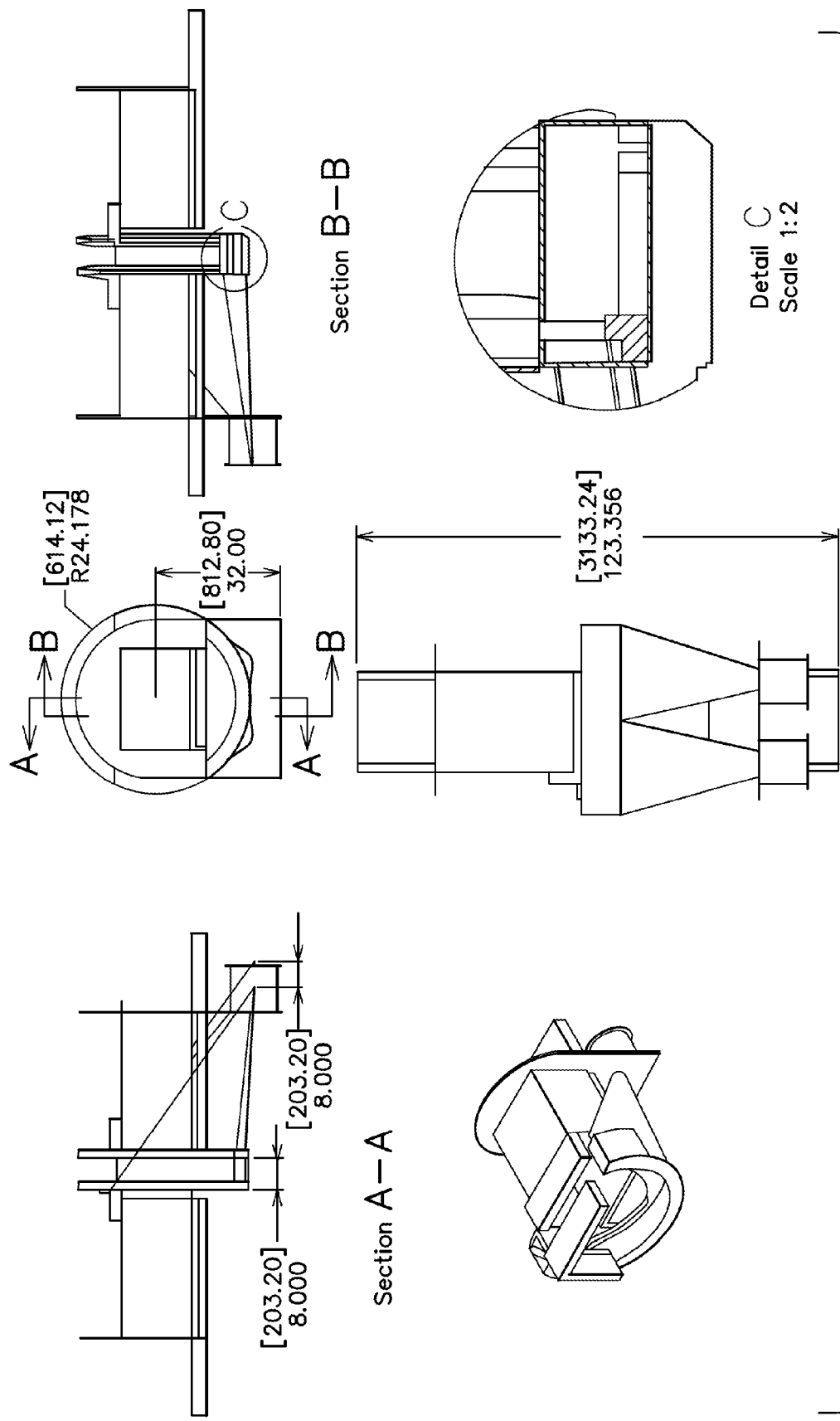
Figure 9:
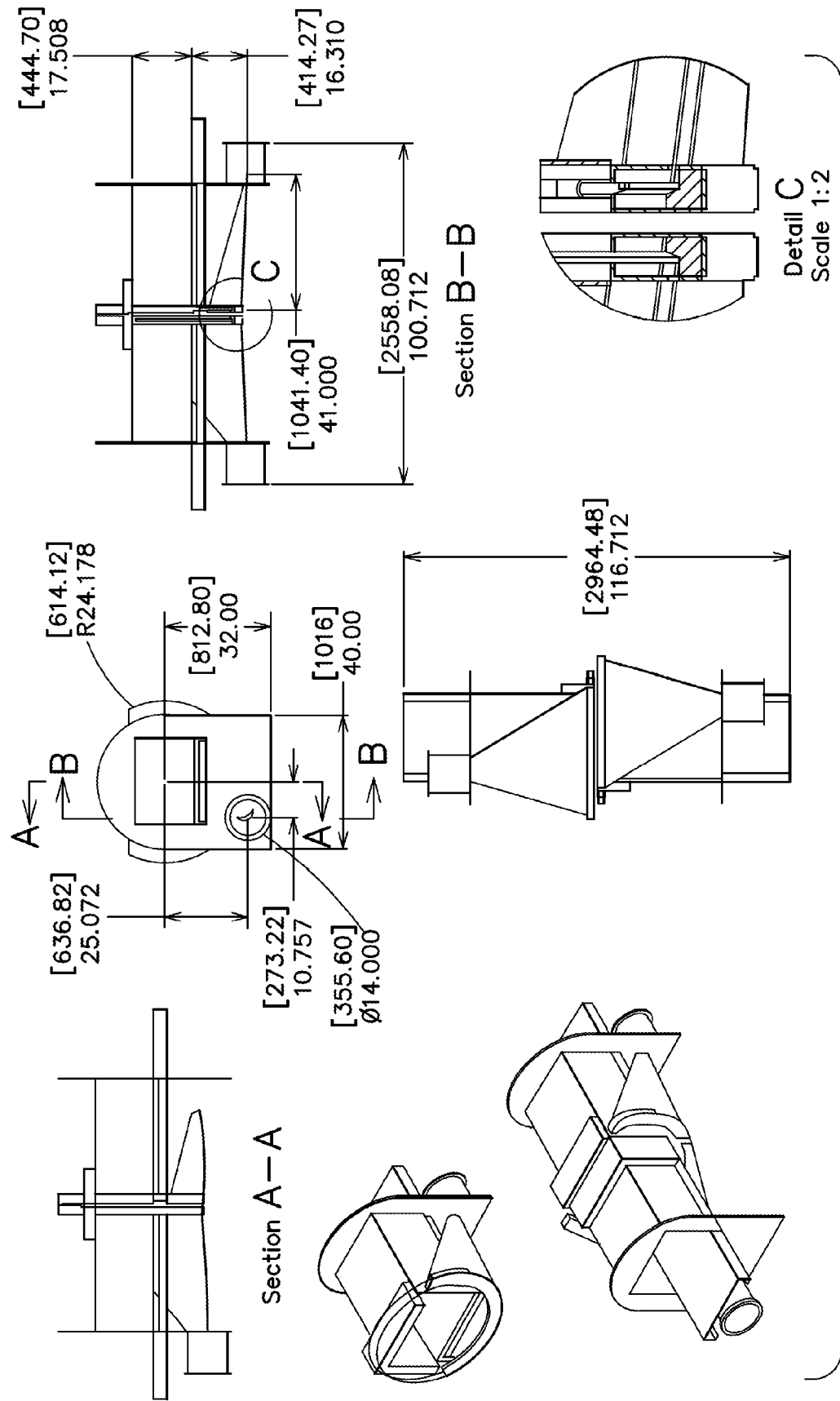
Figure 10:
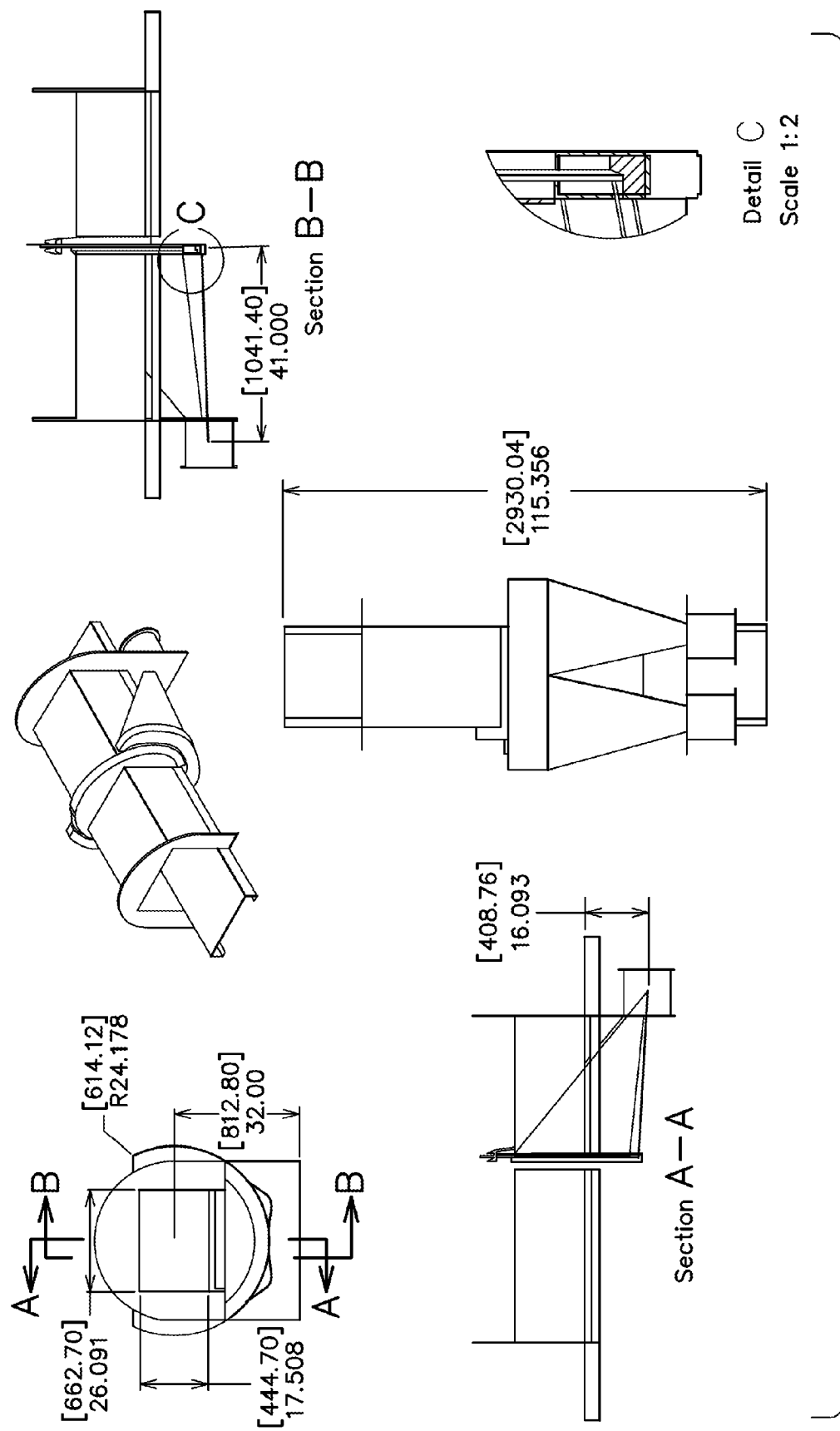
Figure 11:
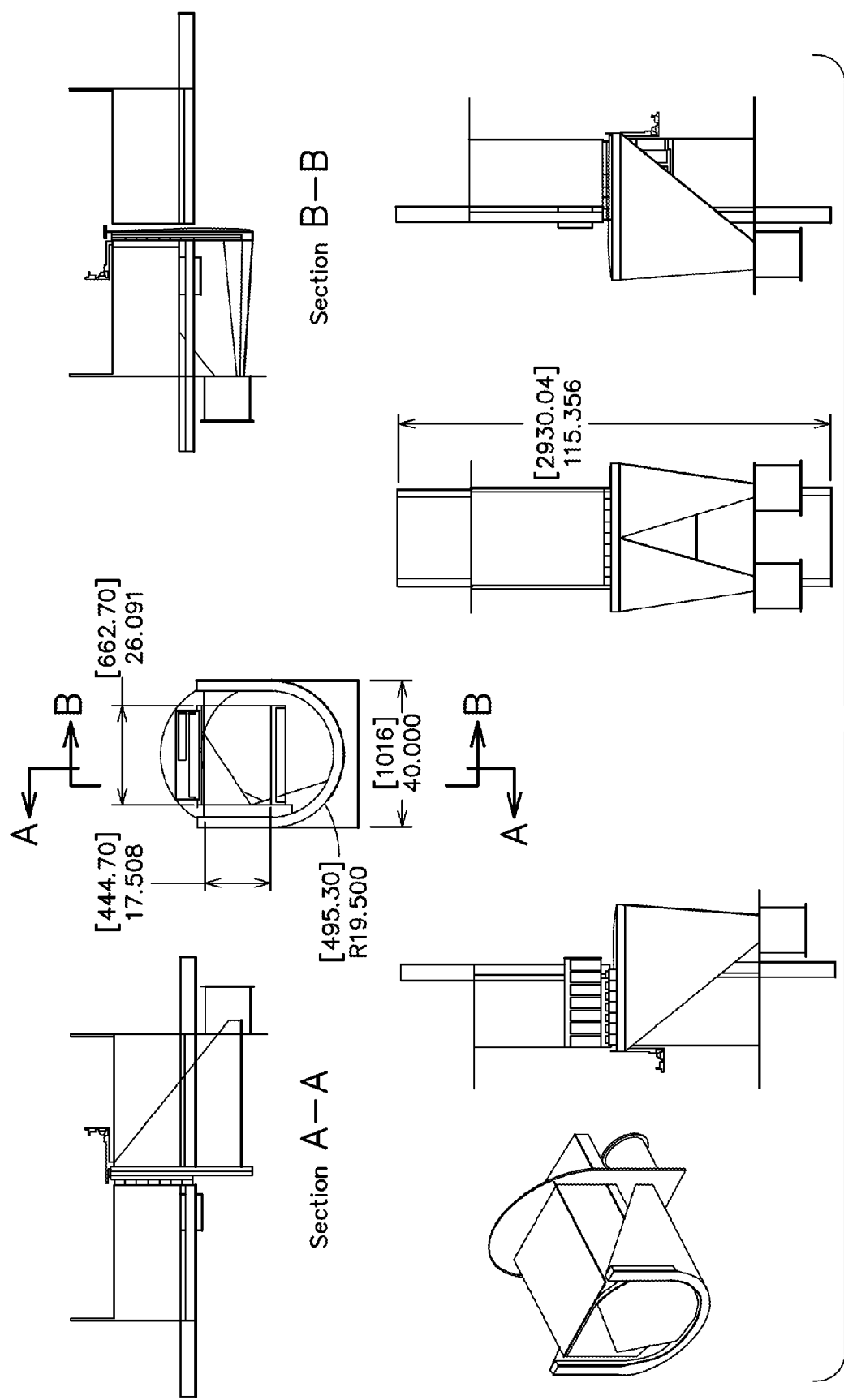
Figure 12:
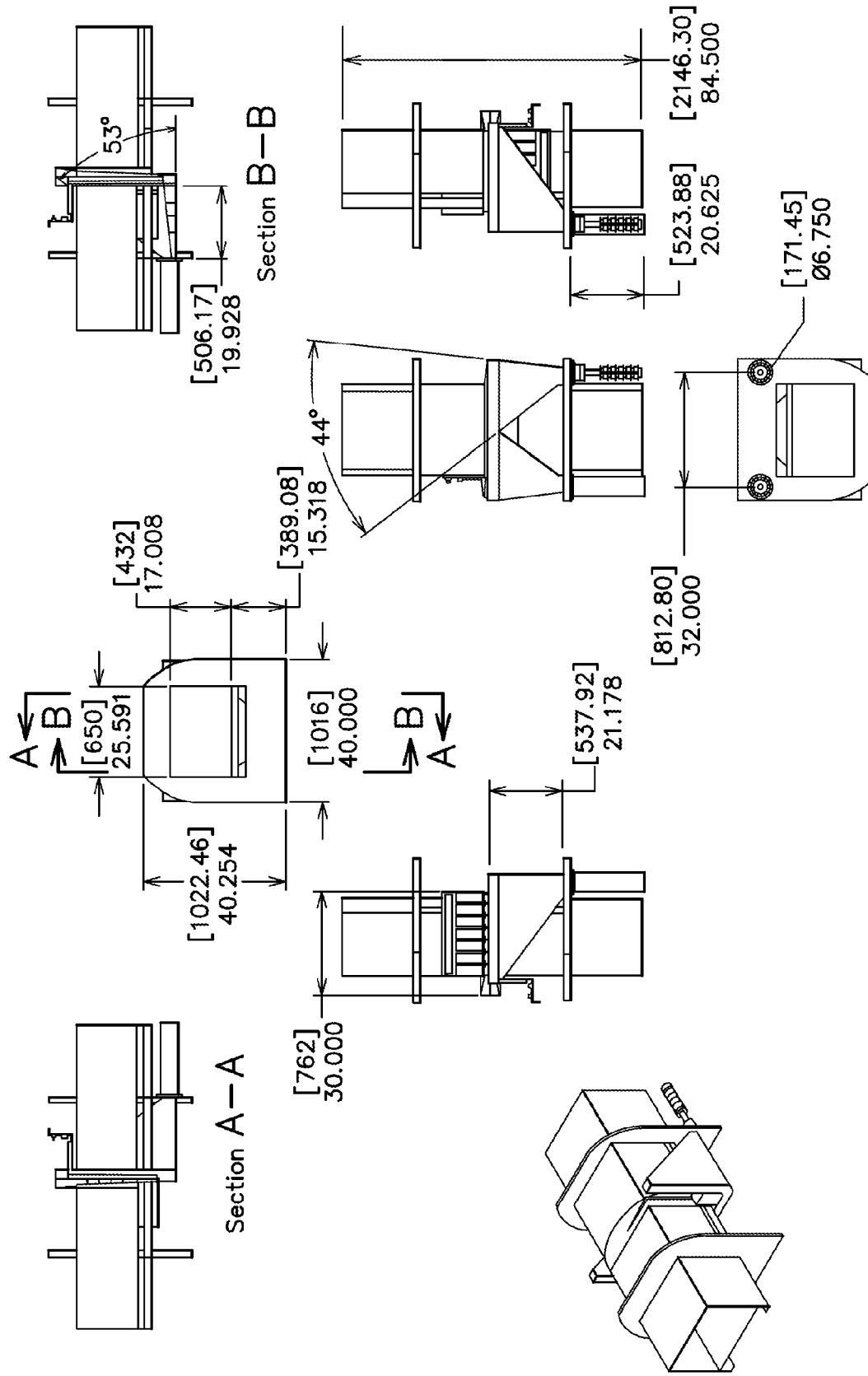
Figure 13:
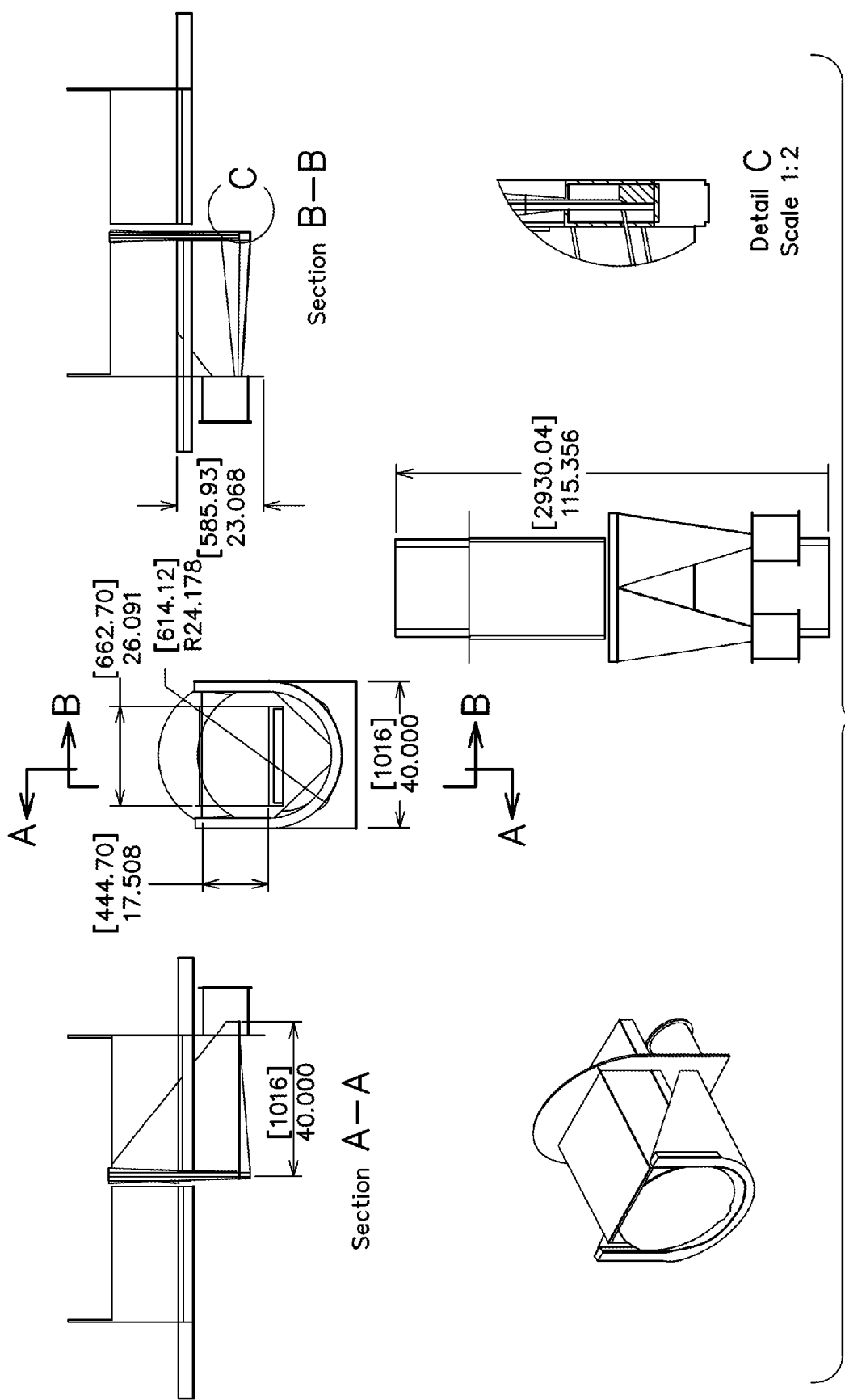
Figure 14A:
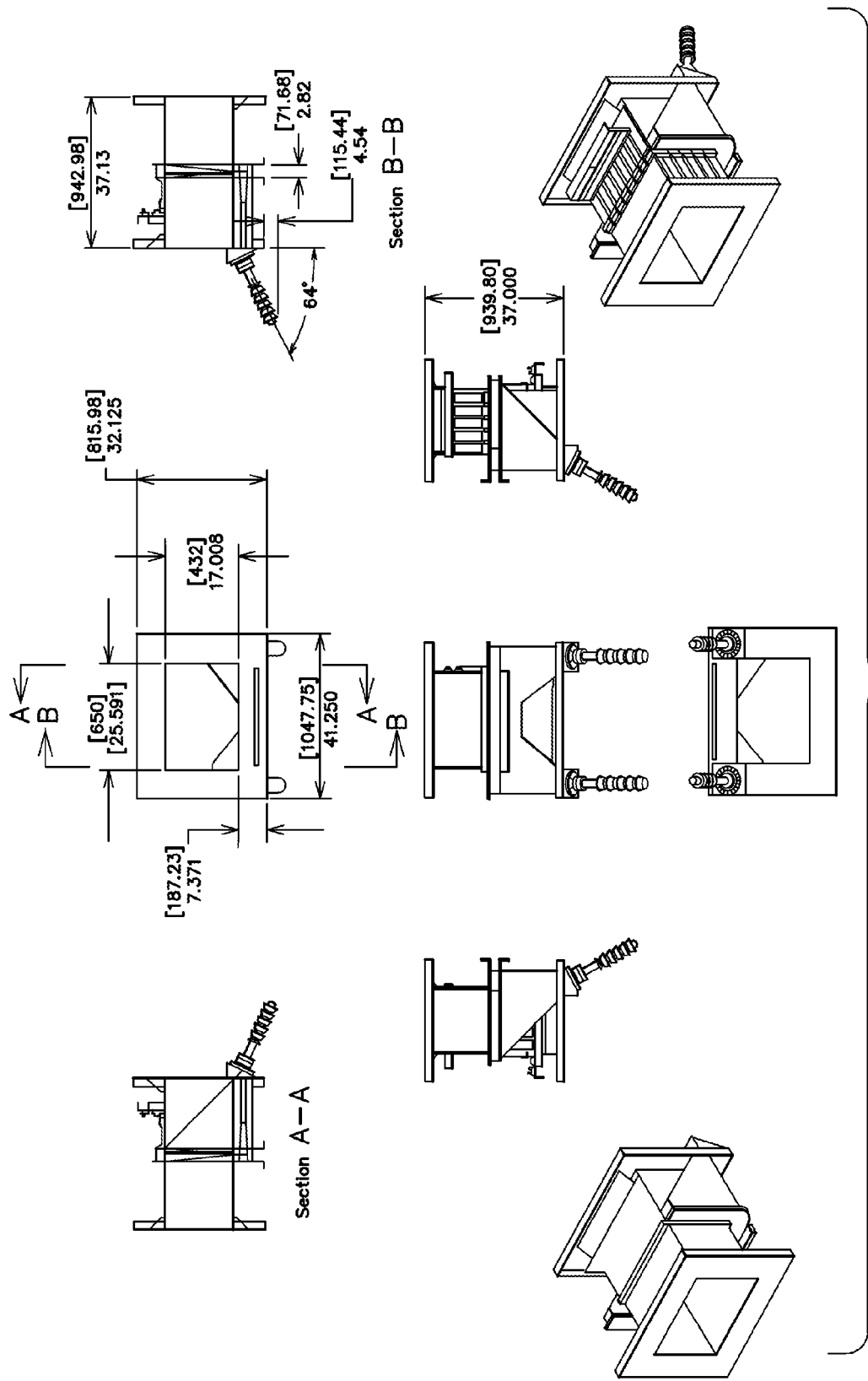
Figure 14D:
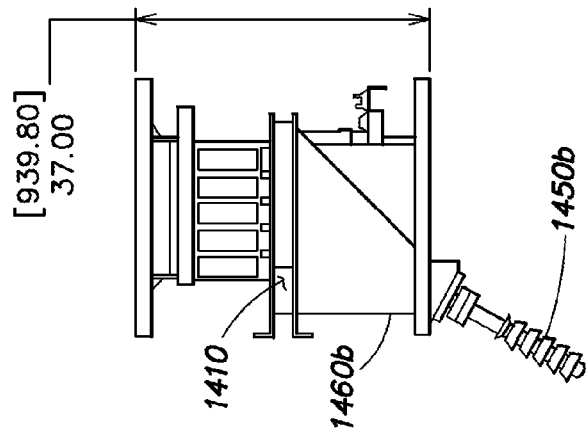
Figure 14C:
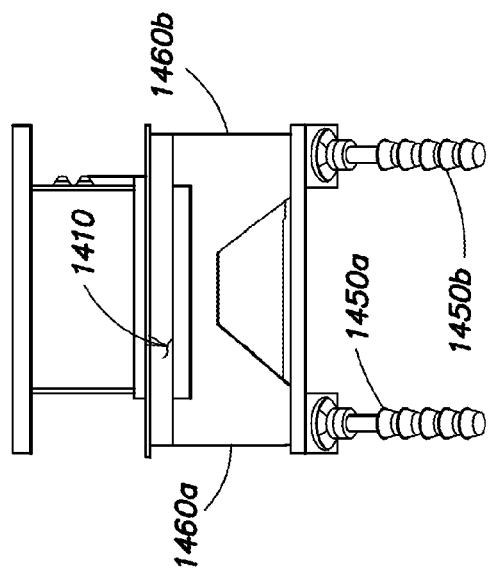
Figure 14B:
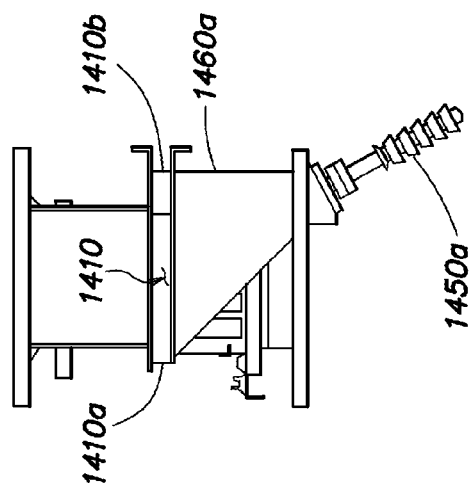
Figure 14E:
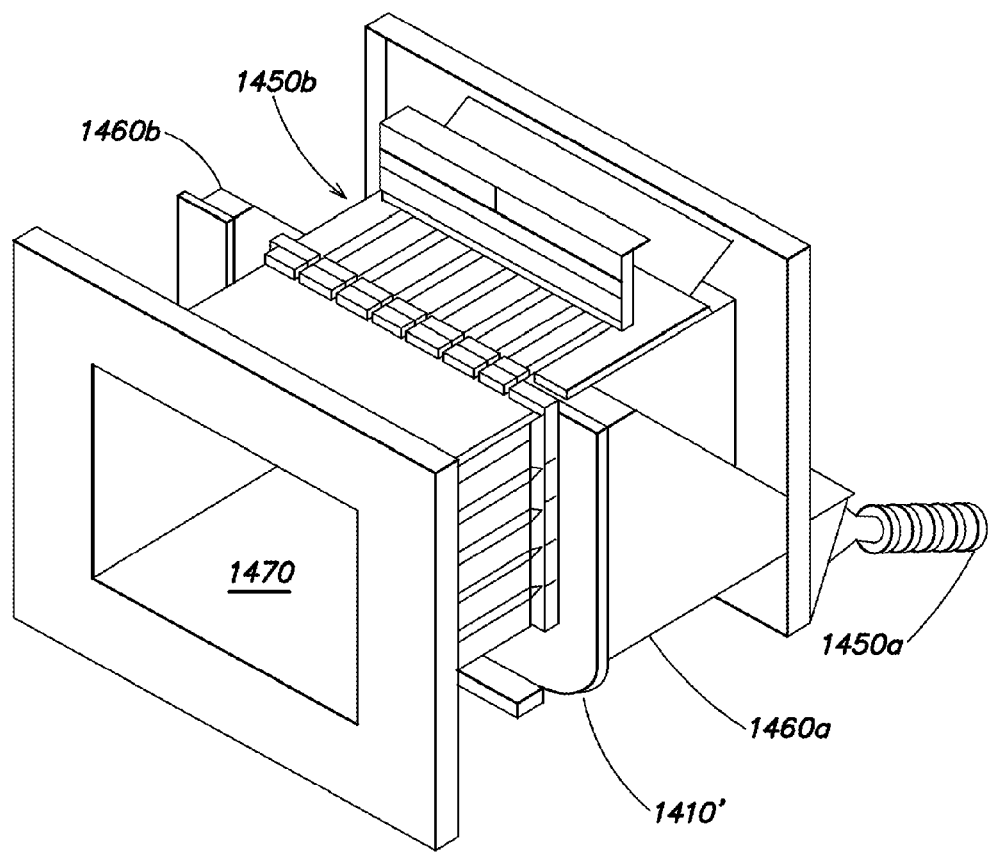
Figure 16:
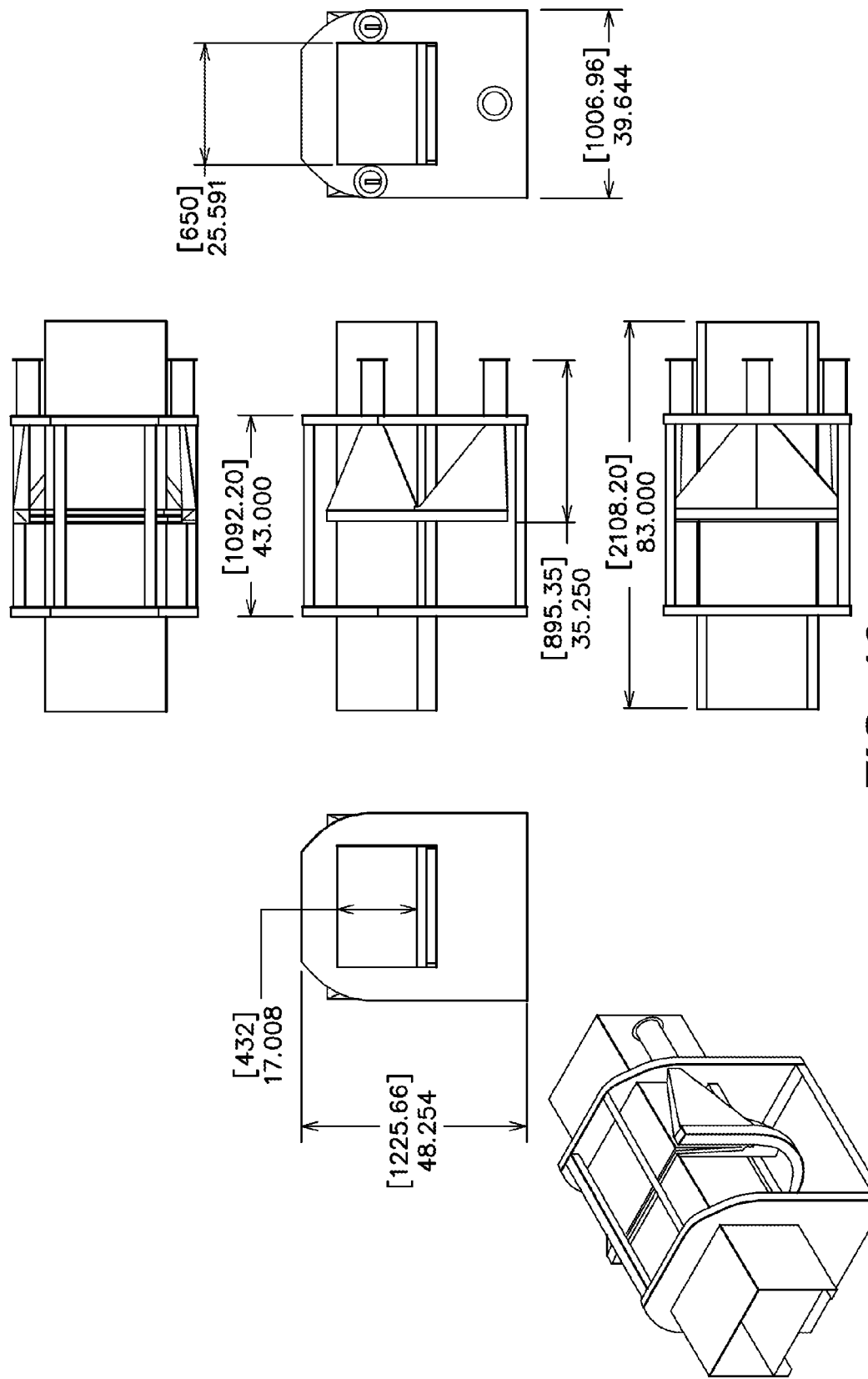

FIG. 7 illustrates portions of an e-beam X-ray scanning system, in accordance with one embodiment of the present invention. X-ray scanning system 2000 includes a non-circular detector array 2200. In particular, detector array 2200 is generally shaped as a rectangular U, sometimes referred to as goal posts, or staple-shaped, comprising substantially linear segments 2210a, 2210b and 2210c. The U-shaped geometry is merely exemplary of an arbitrary geometry array, which as the name suggests, may take on any shape, as the aspects of the invention are not limited in this respect. The various segments of the detector array may be continuous or they may be staggered, for example, along the z-axis, as described in further detail below. To irradiate the detector array 2200, a target 2010 that generally mimics the shape of detector array 2200 is positioned concentrically and diametrically from the detector array and operates as the e-beam anode. Though, it should be appreciated that a target of any suitable size and position may be used.

The term "diametric" refers herein to positioning of a target and detector array in an opposing arrangement such that diametric portions of the detector array and target are generally facing one another such that x-rays emitted from the portions of the target impinge on the diametrically arranged portions of the detector array. Target 2010 includes substantially linear segments 2012a, 2012b, and 2012c and circular arc segments 2014a and 2014b. Accordingly, linear segment 2210c of the detector array is arranged diametrically to linear segment 2012a because the x-ray sensitive regions of the detectors on segment 2210c are facing target segment 2012a. Similarly, segments 2010b and 2010c of the detector array are arranged diametrically to circular segment 2014a of the target. As discussed above, target 2010 may be formed from any material that converts energy from an impinging e-beam into X-rays, such as tungsten, molybdenum, etc. Though, it should be appreciated that a target of any suitable size and position may be used.

To minimize the deflection angle without unduly compromising the size of the inspection area, Applicant has appreciated that multiple e-beam generators, also referred to as electron guns, may be used. In addition, if the required deflection angle may be reduced for a given size target, then, rather than reducing the deflection angle, the same actual deflection angle may be used and the distance between the steering coils and the target may be reduced, as discussed in further detail below. This reduction in distance allows the vacuum tubes through which the e-beams travel after leaving the steering coils to be made smaller, substantially reducing both the cost and bulk of the resulting inspection system.

For example, a first electron gun may be deployed to scan portion 2010a of target 2010 and a second electron gun may be deployed to scan portion 2010b. In one embodiment, each electron gun scans substantially half of the target, and in a sequential fashion. By positioning the electron gun pair to scan substantially half of the array, the deflection angles for each gun may be reduced. For example, the electron guns may be positioned such that the e-beam would impinge somewhere along the respective target in the absence of deflection forces, rather than passing through, for example, a center point of the inspection region.

Alternatively, the electron beams, in the absence of deflection forces, may pass through points closer to respective portions of the target, rather than passing through the center point, or other points generally equidistant from various points along the target. For example, rather than having a single electron gun positioned such that the generated e-beam, in the absence of deflection forces, passes through a center points 2032 (as shown in FIG. 7), a pair of electron guns may be positioned such that their e-beams, in the absence of deflection forces, pass through points 2034a and 2034b, respectively. Multiple e-beam generators may be used in numerous configurations to reduce the required deflection angle and/or reduce vacuum tube sizes, as discussed in further detail below.

It should be appreciated that the target 2010 depicted in FIG. 7 is idealized. During operation of an e-beam imaging system (e.g., X-ray scanning system 2000), the target 2010 may undergo thermal expansion. As such, the target 2010 may comprise segments 2012a, 2014a, 2012b, 2010d, 2010c, 2014b, and 2012c, each of which may expand during operation of the imaging system. Accordingly, the above-mentioned target segments may be arranged so as to accommodate any potential future thermal expansion. For example, the substantially-linear segments 2010c and 2010d may not be joined and there may be a small gap between these segments to provide space into which these segments may expand during operation. The gap may be of any suitable size to accommodate the expansion of target segments, and may be, for example, a 10 mm gap. Though, a gap of any appropriate size may be used.

Similarly, other segments of the target 2010 may not be contiguously arranged, and may be arranged with gaps among them in order to accommodate for their thermal expansion.

The presence of gaps between target segments may impact the range of angles that each voxel of the imaged target may be imaged from. For instance, the presence of a gap between the two L-shaped sections of the target 2010, as shown by blocks 2010a and 2010b in FIG. 7, may lead to a number of voxel being irradiated from a smaller range of angles than they would be if the L-shaped sections were joined. In turn, this may violate the geometric constraints required for direct volumetric image reconstruction methods to produce an accurate volumetric image of an imaged object.

Further, gaps between target segments may arise in other ways. For example, though the idealized target of FIG. 7 is shown as generally a unitary structure, in some embodiments, radiation from multiple angles around a tunnel may be provided by multiple sources positioned around the tunnel. Multiple sources may be used to simplify the construction of the sources in the aggregate. For example a target and a source of an electron beam may be sealed within an enclosure in which a vacuum is created to better allow the electron beam to propagate. Sealing a target that spans approximately 180 degrees of arc around a tunnel may require an enclosure that is larger than may be required if multiple sources, each spanning only a portion of the way around the tunnel are used. However, using separate enclosures between separate sources may result in further gaps in the angular coverage.

Moreover, other geometric constraints may lead to artifacts or other conditions that limit the accuracy of a volumetric image computed using a direct technique. For example, even in the idealized representation of FIG. 7, there source and detector are not positioned symmetrically around the tunnel, such that there may be portions of the tunnel which are exposed to radiation from a different number of directions than others. Nonetheless, even with systems with these geometric constraints, techniques as described, using a combination of direct reconstruction and iterative processing to reconstruct a final image may be used to accurately reconstruct an image.

Multiple e-beam generators may be arranged to scan the target 2010. In some embodiments, two electron guns are housed in respective and independent vacuum tubes, disposed to scan respective portions of the target in each vacuum tube. Other electron gun/vacuum tube arrangements may be used, as the aspects of the invention are not limited in this respect. FIGS. 8-16 illustrate various arrangements of an X-ray system employing two e-beam generators (guns), in accordance with different embodiments of the present disclosure. In the embodiments illustrates in FIGS. 8-16, the target, in the aggregate, is substantially horseshoe shaped, made up of L-shaped segments in each vacuum tube. In this embodiment, the detector array is substantially u-shaped. However, it should be appreciated that both the target and the detector array may be of substantially the same shape, or of different shapes not illustrated herein, as the aspects of the invention are not limited in this respect.

Such a design, or other designs according to the principles described herein, may be used in an inspection system to produce an economical, fast and accurate images. In some embodiments, using an initial estimate of a volumetric image computed using a direct reconstruction technique, followed by iterative processing, volumetric images of items passing through an inspection system may be computed with a resolution of smaller than 3 mm$^3$. In some embodiments, the resolution may be smaller than 2 mm$^3$. In some embodiments, the resolution may be on the order of 1 mm$^3$.

Such resolutions may be achieved using an iterative technique, when seeded with an initial estimate derived from a direct reconstruction technique, with a relative small number of iterations in a relatively small time. For example, less than 10 iterations may be performed. In some embodiments, less than 6 iterations may be performed or, in yet other embodiments, less than 5 iterations may be performed. This number of iterations may be performed to create a volumetric image in less than 10 seconds. In some embodiments, processing may be completed in less than 6 seconds. In yet further embodiments, this processing may be completed in 3 seconds or less.

In an inspection system, this technique may lead to images that are suitable for detection of explosives or other contraband in suitcases or other luggage at a relatively high throughput. In some embodiments, a conveyor may move bags, such as suitcases or other parcels having dimensions to fit in approximately a 1 m tunnel, through the inspection system at a rate that exceeds 250 bags per hour. In some embodiments, the bags may move at a rate that exceeds 500 bags per hour. In yet other embodiments, the rate may exceed 750 bags per hour or may be on the order of 1,000 bags per hour. Accordingly, such a system may be installed in-line in a baggage handling system and coupled to a computer that is programmed to apply contraband detection algorithms to the volumetric images formed by the system.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method for deriving a full-volume volumetric image of an object being imaged, the method comprising:

calculating a first volumetric image of the object using a direct reconstruction method from a plurality of radiation measurements of the object taken from a plurality of directions, wherein calculating the first volumetric image comprises calculating a value for each voxel in the first volumetric image; and performing at least one iteration of a nonregulating iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein performing the at least one iteration comprises calculating a value for each voxel in the second volumetric image, wherein the iterative reconstruction method comprises ordered subset maximum likelihood, algebraic reconstruction technique, simultaneous algebraic reconstruction technique, simultaneous iterative reconstruction technique, least-squares QR method, expectation maximization, ordered subset convex method, or ordered subset expectation maximization, and wherein the plurality of radiation measurements does not satisfy a volumetric reconstruction requirement.

2. The computer-implemented method of claim 1, wherein performing at least one iteration comprises performing an iteration of the iterative reconstruction method one, two, three, four, five, six, seven, eight, nine or ten times.

3. The computer-implemented method of claim 1, wherein the direct reconstruction method comprises filtered back projection, direct Fourier reconstruction, analytic cone beam method, or approximate cone beam method.

4. The computer-implemented method of claim 1, wherein calculating the first volumetric image of the object using a direct reconstruction method further comprises using a plurality of different direct reconstruction methods to produce a plurality of volumetric images and selecting the first volumetric image from the plurality of volumetric images based on an error criterion.

5. The computer-implemented method of claim 1, wherein performing at least one iteration comprises:
- calculating, for each iteration, an error value in the projection image domain; and
- performing another iteration of the iterative reconstruction method if the error value is above a threshold amount.

6. The computer-implemented method of claim 1, wherein the volumetric reconstruction requirement is a requirement selected from the group consisting of a Tuy condition, a pi-line condition, a Nyquist condition, and a non-truncation condition.

7. The computer-implemented method of claim 1, wherein a volume of each voxel in the second volumetric image is less than or equal to five cubic millimeters.

8. A system for deriving a full-volume volumetric image of an object comprising: at least one processor configured to:
- calculate a first volumetric image of the object using a direct reconstruction method from a plurality of radiation measurements of the object taken from different directions, wherein the at least one processor is configured to calculate the first volumetric image by calculating a value for each voxel in the first volumetric image; and;
- perform at least one iteration of a nonregulating iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein the at least one processor is configured to perform the at least one iteration by calculating a value for each voxel in the second volumetric image,
- wherein the iterative reconstruction method comprises ordered subset maximum likelihood, algebraic reconstruction technique, simultaneous algebraic reconstruction technique, simultaneous iterative reconstruction technique, least-squares QR method, expectation maximization, ordered subset convex method, or ordered subset expectation maximization, and
- wherein the plurality of radiation measurements does not satisfy a volumetric reconstruction requirement.

9. The system of claim 8, further comprising a plurality of radiation source-detector pairs, each radiation source-detector pair in the plurality of radiation source-detector pairs being operable to obtain at least one radiation measurement of the object.

10. The system of claim 8, wherein the plurality of radiation source-detector pairs is arranged so that at least 75 percent of the voxels of the object are imaged from at least 180 angles.

11. The system of claim 8, wherein the plurality of radiation source-detector pairs is arranged so that all the voxels of the object are imaged from at least 180 angles.

12. The system of claim 8, further comprising a plurality of steered e-beams impinging on a target.

13. The system of claim 12, wherein the e-beams are not arranged symmetrically about the target.

14. The system of claim 8, wherein the volumetric reconstruction requirement is a requirement selected from the group consisting of a Tuy condition, a pi-line condition, a Nyquist condition, and a non-truncation condition.

15. The system of claim 8, wherein the direct reconstruction method comprises filtered back projection, direct Fourier reconstruction, analytic cone beam method, or approximate cone beam method.

16. The system of claim 8 comprising at least one processor configured to perform at least one iteration by:
- calculating, for each iteration, an error value; and
- performing another iteration of the iterative reconstruction method if the error value is above a threshold amount.

17. The system of claim 8, wherein a volume of each voxel in the second volumetric image is less than or equal to five cubic millimeters.

18. The system of claim 8, wherein the second volumetric image is computed in less than three seconds.

19. At least one computer-readable medium storing processor-executable instructions that when executed by at least one processor perform a method for deriving a full-volume volumetric image of an object being imaged, the method comprising:
- calculating a first volumetric image of the object using a direct reconstruction method from a plurality of radiation measurements of the object taken from different directions, wherein calculating the first volumetric image comprises calculating a value for each voxel in the first volumetric image; and
- performing at least one iteration of an iterative reconstruction method to compute a second volumetric image of the object, wherein the iterative reconstruction method is initialized with the first volumetric image of the object, wherein the second volumetric image comprises a corresponding voxel for each voxel in the first volumetric image, and wherein performing the at least one iteration comprises calculating a value for each voxel in the second volumetric image,
- wherein the iterative reconstruction method comprises ordered subset maximum likelihood, algebraic reconstruction technique, simultaneous algebraic reconstruction technique, simultaneous iterative reconstruction technique, least-squares QR method, expectation maximization, ordered subset convex method, or ordered subset expectation maximization,
- wherein the plurality of radiation measurements does not satisfy a volumetric reconstruction requirement.

20. The at least one computer-readable medium of claim 19, wherein performing at least one iteration comprises performing an iteration of the iterative reconstruction method one, two, three, four, five, six, seven, eight, nine or ten times.

21. The at least one computer-readable medium of claim 19, wherein the direct reconstruction method comprises filtered back projection, direct Fourier reconstruction, analytic cone beam method, or approximate cone beam method.

22. The at least one computer-readable medium of claim 19, wherein calculating the first volumetric image of the object using a direct reconstruction method further comprises using a plurality of different direct reconstruction methods to produce a plurality of volumetric images and selecting the first volumetric image from the plurality of volumetric images based on an error criterion.

23. The at least one computer-readable medium of claim 19, wherein performing at least one iteration comprises:
- calculating, for each iteration, an error value; and
- performing another iteration of the iterative reconstruction method if the error value is above a threshold amount.

24. The at least one computer-readable medium of claim 19, wherein the volumetric reconstruction requirement is a requirement selected from the group consisting of a Tuy condition, a pi-line condition, a Nyquist condition, and a non-truncation condition.

25. The at least one computer-readable medium of claim 19, wherein a volume of each voxel in the second volumetric image is less than or equal to five cubic millimeters.

26. A system for deriving a full-volume volumetric image of an object comprising at least one processor configured to:
calculate a first volumetric image of the object using a direct reconstruction method from a plurality of radiation measurements of the object taken from different directions, wherein the at least one processor is configured to calculate the first volumetric image by calculating a value for each voxel in the first volumetric image; and;
perform at least one iteration of an iterative reconstruction method at least in part by calculating a measure of error in the projection image domain between the first volumetric image and the plurality of radiation measurements and updating the first volumetric image based on a quantity depending only on the calculated measure of error to compute a second volumetric image of the object, wherein the second volumetric image comprises a corresponding voxel for each voxel in the first volumetric image, and wherein computing the second volumetric image comprises calculating a value for each voxel in the second volumetric image,
wherein the iterative reconstruction method comprises ordered subset maximum likelihood, algebraic reconstruction technique, simultaneous algebraic reconstruction technique, simultaneous iterative reconstruction technique, least-squares QR method, expectation maximization, ordered subset convex method, or ordered subset expectation maximization, and
wherein the plurality of radiation measurements does not satisfy a volumetric reconstruction requirement.

27. The system of claim 26, further comprising a plurality of radiation source-detector pairs, each radiation source-detector pair in the plurality of radiation source-detector pairs being operable to obtain at least one radiation measurement of the object.

28. The system of claim 27, wherein the plurality of radiation source-detector pairs is arranged so that at least 75 percent of the voxels of the object are imaged from at least 180 angles.

29. The system of claim 26, wherein calculating the measure of error in the projection image domain comprises comparing a forward projection of the second volumetric image of the object to the plurality of radiation measurements.

30. The system of claim 26, wherein the volumetric reconstruction requirement is a requirement selected from the group consisting of a Tuy condition, a pi-line condition, a Nyquist condition, and a non-truncation condition.

31. The system of claim 26, wherein a volume of each voxel in the second volumetric image is less than or equal to five cubic millimeters.

* * * * *